(12) United States Patent
Yamaguchi et al.

(10) Patent No.: US 11,378,175 B2
(45) Date of Patent: Jul. 5, 2022

(54) ACTUATOR

(71) Applicant: DENSO CORPORATION, Kariya (JP)

(72) Inventors: Masashi Yamaguchi, Kariya (JP); Etsugo Yanagida, Kariya (JP); Tetsuji Yamanaka, Kariya (JP); Atsushi Tanaka, Kariya (JP); Naoaki Kono, Kariya (JP); Kunio Namba, Kariya (JP)

(73) Assignee: DENSO CORPORATION, Kariya (JP)

( * ) Notice: Subject to any disclaimer, the term of this patent is extended or adjusted under 35 U.S.C. 154(b) by 172 days.

(21) Appl. No.: 16/736,210

(22) Filed: Jan. 7, 2020

(65) Prior Publication Data

US 2020/0217410 A1 Jul. 9, 2020

(30) Foreign Application Priority Data

Jan. 9, 2019 (JP) .............................. JP2019-001510

(51) Int. Cl.
*F16H 57/032* (2012.01)
*H02K 7/116* (2006.01)
(Continued)

(52) U.S. Cl.
CPC ........... *F16H 57/032* (2013.01); *F16H 55/06* (2013.01); *F16H 55/17* (2013.01); *H02K 7/116* (2013.01);
(Continued)

(58) Field of Classification Search
CPC .......... F16H 55/06; F16H 55/14; F16H 55/17; F16H 57/032; F16H 2055/065;
(Continued)

(56) References Cited

U.S. PATENT DOCUMENTS 4,078,445 A * 3/1978 Kiser, Jr. ................. F16H 55/30
29/893.3
6,053,060 A * 4/2000 Tumberlinson ....... F02N 15/062
123/179.26
(Continued)

FOREIGN PATENT DOCUMENTS

DE 102020202922 A1 * 9/2021
JP 6-37645 5/1994
(Continued)

OTHER PUBLICATIONS

JP 2004308694 (Ina Eiji) Nov. 4, 2004. [online] [retrieved on Nov. 18, 2021]. Retrieved from: ProQuest Dialog. (Year: 2004).*
(Continued)

*Primary Examiner* — Joseph Brown
(74) *Attorney, Agent, or Firm* — Nixon & Vanderhye P.C.

(57) ABSTRACT

An actuator includes an electric motor, an output shaft and a speed reducer. The speed reducer is configured to transmit rotation, which is outputted from the motor, to the output shaft after reducing a speed of the rotation outputted from the motor. The speed reducer includes an output gear joined to the output shaft and a compound gear. The compound gear includes a large diameter gear, which has a plurality of large gear teeth, and a small diameter gear, which has a plurality of small gear teeth. One of the large diameter gear and the small diameter gear is a metal gear, which is made of a metal member, while another one of the large diameter gear and the small diameter gear is a resin gear, which is made of a resin member, and the resin gear is integrally molded together with the metal gear in one piece.

27 Claims, 27 Drawing Sheets

(51) Int. Cl.
  *F16H 55/17* (2006.01)
  *F16H 55/06* (2006.01)
  *F16H 57/02* (2012.01)
  *F16H 55/18* (2006.01)

(52) U.S. Cl.
  CPC .. *F16H 2055/065* (2013.01); *F16H 2055/185* (2013.01); *F16H 2057/02034* (2013.01)

(58) Field of Classification Search
  CPC ............ F16H 2055/185; F16H 57/028; F16H 2057/02034; H02K 7/116; B29L 2015/003
  USPC ........... 74/434, 439, 440, 443, 446, DIG. 10
  See application file for complete search history.

(56) References Cited

U.S. PATENT DOCUMENTS

| | | | |
|---|---|---|---|
| 2014/0184204 A1 | 7/2014 | Kouno et al. | |
| 2016/0288379 A1* | 10/2016 | Ozawa | B29B 11/12 |
| 2018/0187791 A1 | 7/2018 | Yamanaka et al. | |
| 2020/0248791 A1* | 8/2020 | Kobayashi | F16H 55/17 |

FOREIGN PATENT DOCUMENTS

| | | | | |
|---|---|---|---|---|
| JP | 2001-119895 | 4/2001 | | |
| JP | 2004-308694 | 11/2004 | | |
| JP | 2015-175464 | 10/2015 | | |
| JP | 2020112178 A | * 7/2020 | | |
| KR | 20170116897 A | * 10/2017 | | |
| WO | WO-9418476 A1 | * 8/1994 | ............ | F16H 55/14 |
| WO | WO-2015144413 A1 | * 10/2015 | ............ | F16H 55/06 |

OTHER PUBLICATIONS

KR 20170116897 (Kim Hyo Jun) Oct. 20, 2017. [online] [retrieved on Nov. 18, 2021]. Retrieved from: ProQuest Dialog. (Year: 2017).*
U.S. Appl. No. 16/736,182 to Yamaguchi et al., entitled "Actuator", filed Jan. 7, 2020 (36 pages).
U.S. Appl. No. 16/736,247 to Hokuto et al., entitled "Actuator", filed Jan. 7, 2020 (47 pages).
U.S. Appl. No. 16/736,182, filed Jan. 7, 2020, Actuator.
U.S. Appl. No. 16/736,247, filed Jan. 7, 2020, Actuator.

* cited by examiner

ACTUATOR

CROSS REFERENCE TO RELATED APPLICATION

This application is based on and incorporates herein by reference Japanese Patent Application No. 2019-001510 filed on Jan. 9, 2019.

TECHNICAL FIELD

The present disclosure relates to an actuator.

BACKGROUND

There has been proposed an actuator of a parking brake system, which drives a brake mechanism. A compound gear, which is used in this actuator, includes a metal gear, which has small gear teeth and is made of metal, and a resin gear, which has large gear teeth and is made of resin.

SUMMARY

This section provides a general summary of the disclosure, and is not a comprehensive disclosure of its full scope or all of its features.

According to the present disclosure, there is provided an actuator that includes an electric motor, an output shaft and a speed reducer. The speed reducer is configured to transmit rotation, which is outputted from the electric motor, to the output shaft after reducing a speed of the rotation outputted from the electric motor. The speed reducer includes a compound gear. The compound gear includes a large diameter gear, which has a plurality of large gear teeth, and a small diameter gear, which has a plurality of small gear teeth. One of the large diameter gear and the small diameter gear is a metal gear, and another one of the large diameter gear and the small diameter gear is a resin gear.

BRIEF DESCRIPTION OF THE DRAWINGS

The drawings described herein are for illustrative purposes only of selected embodiments and not all possible implementations, and are not intended to limit the scope of the present disclosure.

DETAILED DESCRIPTION

There has been proposed an actuator of a parking brake system, which drives a brake mechanism. A compound gear, which is used in this actuator, includes: a metal gear, which has small gear teeth and is made of metal; a resin gear, which has large gear teeth and is made of resin; and a metal plate. In this compound gear, an outer peripheral portion of the metal plate is coupled to the resin gear, which has the large gear teeth and is made of the resin, and an inner peripheral portion of the metal plate is coupled to the metal gear, which has the small gear teeth and is made of the metal. Furthermore, the resin gear, which has the large gear teeth and is made of the resin, is held between the metal plate and the metal gear, which has the small gear teeth and is made of the metal.

However, in the above described actuator, there is a possibility of generating rattling or damage of a connection between the resin gear and the metal gear, which would be caused by generation of a gap at the connection due to dimensional accuracy and/or assembly accuracy of the connection, or due to a stress applied to the connection in response to a temperature change, application of torque, and generation of vibration at the connection. The above disadvantage is not limited to the actuator of the parking brake system and may also occur at, for example, an actuator that controls a boost pressure of a supercharger.

According to one aspect of the present disclosure, there is provided an actuator. The actuator includes: an electric motor; an output shaft; and a speed reducer that is configured to transmit rotation, which is outputted from the electric motor, to the output shaft after reducing a speed of the rotation outputted from the electric motor. The speed reducer has a plurality of gears that include an output gear joined to the output shaft. The plurality of gears further includes a compound gear. The compound gear includes a large diameter gear, which has a plurality of large gear teeth, and a small diameter gear, which has a plurality of small gear teeth. One of the large diameter gear and the small diameter gear is a metal gear, which has a plurality of teeth and is made of a metal member, while another one of the large diameter gear and the small diameter gear is a resin gear, which has a plurality of teeth and is made of a resin member, and the resin gear is integrally molded together with the metal gear in one piece. According to this aspect, the resin gear of the compound gear is made of the resin member integrally molded with the metal gear. Thus, the metal gear and the resin gear are joined together without forming a gap between the metal gear and the resin gear. Therefore, it is possible to improve the durability against at least one of a temperature change, a gear torque and vibrations.

Now, embodiments of the present disclosure will be described with reference to the accompanying drawings.

First Embodiment

Figure 1:
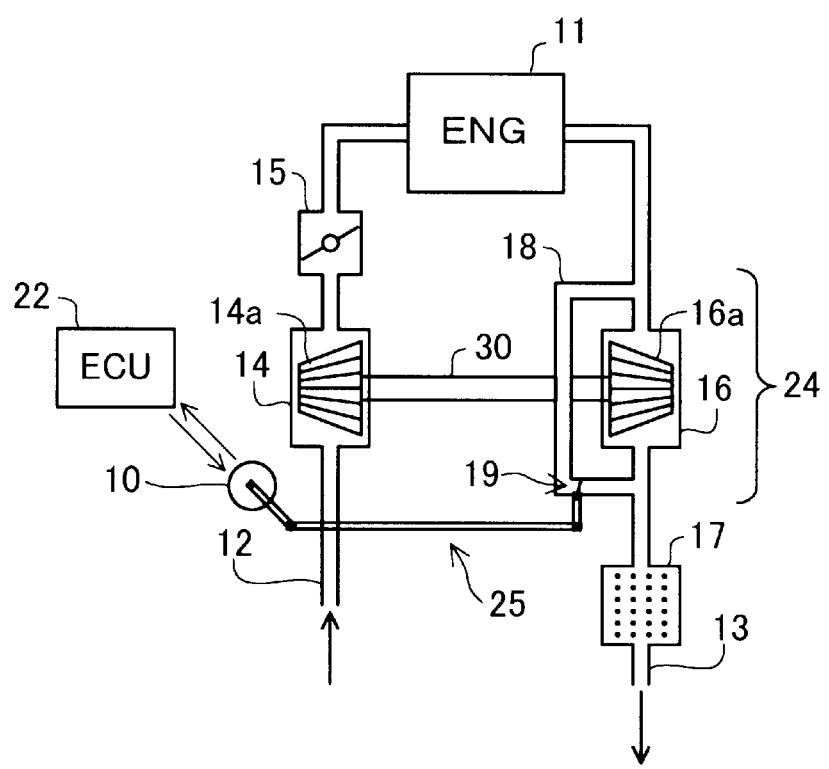
FIG. 1 is a schematic diagram of an intake and exhaust system of an internal combustion engine, to which an actuator of a first embodiment is applied.

As shown in FIG. 1, an actuator 10 of a first embodiment is applied to an internal combustion engine (hereinafter simply referred to as an engine) 11 that is a drive source for driving a vehicle.

The engine 11 has an intake passage 12, which conducts the air to cylinders of the engine 11, and an exhaust passage 13, which discharges an exhaust gas generated at the cylinders to the atmosphere. A compressor wheel 14a of an intake compressor 14 of a supercharger 24 and a throttle valve 15 are installed in the intake passage 12. The compressor wheel 14a supercharges the air to the engine 11. The throttle valve 15 adjusts the amount of intake air supplied to the engine 11 according to the amount of depression of an accelerator pedal (not shown) of the vehicle.

A turbine wheel 16a of an exhaust turbine 16 of the supercharger 24 and a catalyst 17 for purifying the exhaust gas are installed in the exhaust passage 13. The turbine wheel 16a is connected to the compressor wheel 14a through a rotatable shaft 30. Specifically, the turbine wheel 16a is rotated by the exhaust gas energy of the engine 11 to rotate the compressor wheel 14a. The catalyst 17 is a known three-way catalyst, which has a monolithic structure. When the temperature of the catalyst 17 is raised to an activation temperature by the exhaust gas, the catalyst 17 purifies harmful substances contained in the exhaust gas through oxidation and reduction.

A bypass passage 18 is formed at the exhaust passage 13 in parallel with the turbine wheel 16a to conduct the exhaust gas while bypassing the turbine wheel 16a. A wastegate valve 19, which is a boost pressure control valve, is installed in the bypass passage 18. When the wastegate valve 19 is opened, a portion of the exhaust gas outputted from the engine 11 is directly guided to the catalyst 17 through the bypass passage 18. The wastegate valve 19 is opened when the pressure of the exhaust gas outputted from the engine 11 is increased beyond a valve opening pressure of the wastegate valve 19. Furthermore, the opening and closing of the wastegate valve 19 is also controlled by an engine control unit (ECU) 22. Specifically, the ECU 22 drives the actuator 10 to open and close the wastegate valve 19 through a linkage mechanism 25 that is installed between the actuator 10 and the wastegate valve 19.

Figure 2:
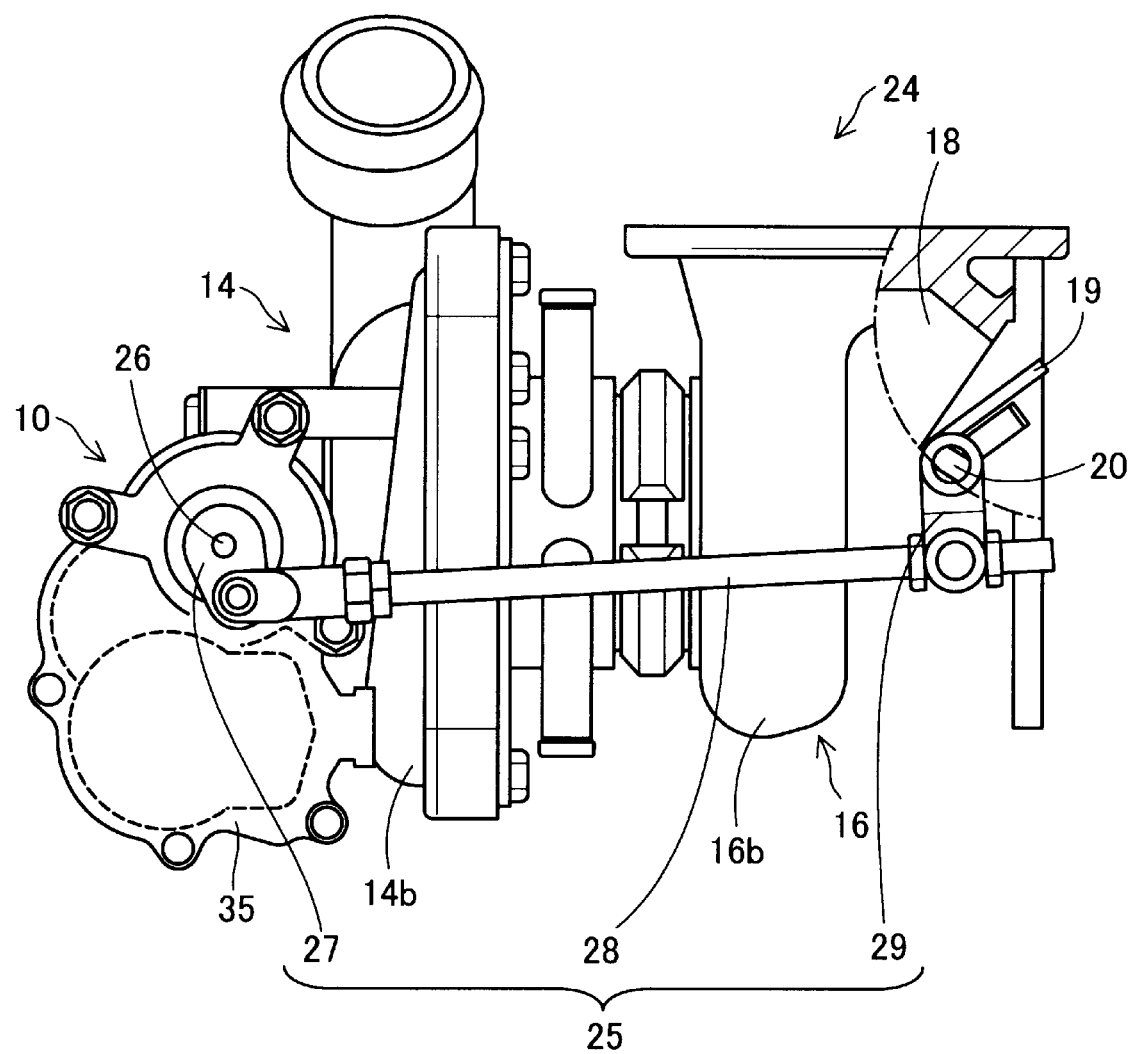
FIG. 2 is a descriptive diagram of a supercharger of the first embodiment.

As shown in FIG. 2, the supercharger 24 includes the exhaust turbine 16, the intake compressor 14 and the actuator 10. The exhaust turbine 16 includes the turbine wheel 16a (see FIG. 1), which is rotated by the exhaust gas outputted from the engine 11, and a turbine housing 16b, which is shaped in a spiral form and receives the turbine wheel 16a. The intake compressor 14 includes the compressor wheel 14a (see FIG. 1), which is rotated by the rotational force of the turbine wheel 16a, and a compressor housing 14b, which is shaped in a spiral form and receives the compressor wheel 14a. The turbine wheel 16a and the compressor wheel 14a are connected with each other by the rotatable shaft 30 (see FIG. 1).

Besides the turbine wheel 16a, the bypass passage 18 is provided at the turbine housing 16b. The bypass passage 18 directly conducts the exhaust gas, which enters the turbine housing 16b, to an exhaust gas outlet of the turbine housing 16b without supplying the exhaust gas to the turbine wheel 16a. The bypass passage 18 is opened and closed by the wastegate valve 19. The wastegate valve 19 is a swing valve that is rotatably supported by a valve shaft 20 at the inside of the turbine housing 16b. Although the wastegate valve 19 is opened when the pressure of the exhaust gas is increased beyond the valve opening pressure, the wastegate valve 19 can be opened and closed by the actuator 10.

A housing 35, which receives the actuator 10, is installed to the intake compressor 14 that is spaced from the exhaust turbine 16 of the supercharger 24. With this configuration, it is possible to avoid an influence of a heat of the exhaust gas. The supercharger 24 includes the linkage mechanism 25 (see FIG. 1) that transmits the output of the actuator 10 to the wastegate valve 19. In the present embodiment, the linkage mechanism 25 is a four-bar linkage mechanism that includes an actuator lever 27, a rod 28 and a valve lever 29. The actuator lever 27 is joined to the output shaft 26 of the actuator 10 and is rotated by the actuator 10. The valve lever 29 is joined to the valve shaft 20. The rod 28 transmits the rotational torque, which is applied to the actuator lever 27, to the valve lever 29.

The operation of the actuator 10 is controlled by the ECU 22 that has a microcomputer. Specifically, the ECU 22 controls the actuator 10 to adjust the opening degree of the wastegate valve 19 at the time of, for example, rotating the engine 11 at a high rotational speed to control the boost pressure of the supercharger 24. Furthermore, when the temperature of the catalyst 17 does not reach the activation temperature at, for example, the time immediately after cold start of the engine 11, the ECU 22 controls the actuator 10 to fully open the wastegate valve 19 to warm up the catalyst 17 with the exhaust gas. In this way, the high temperature exhaust gas, which has not lost its heat to the turbine wheel 16a, can be directly conducted to the catalyst 17, so that the catalyst 17 can be warmed up within a short period of time.

Figure 3:
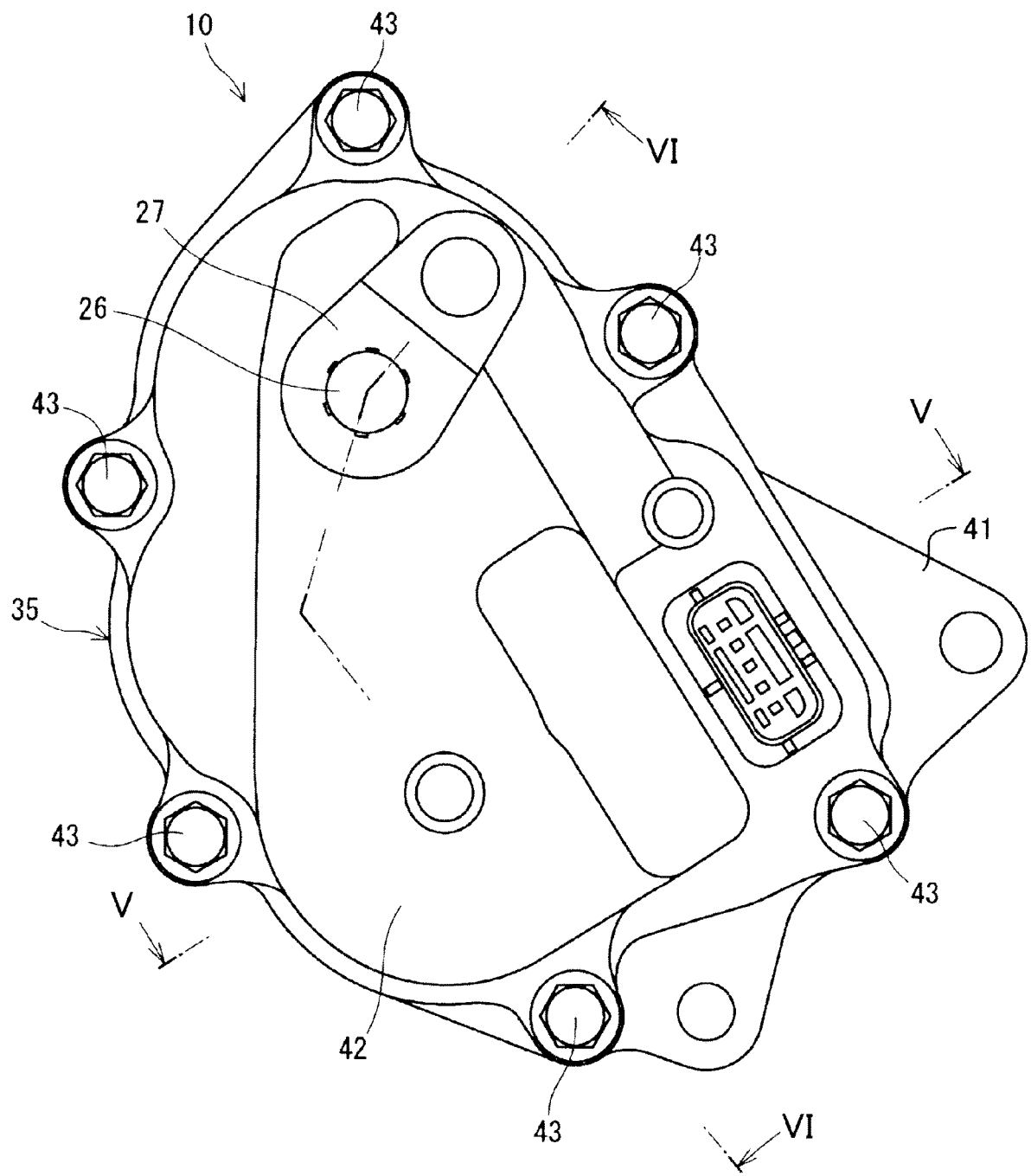
FIG. 3 is a plan view of the actuator of the first embodiment.

Next, the actuator 10 will be described with reference to FIGS. 3 to 6. The actuator 10 is received in the housing 35 that is installed to the intake compressor 14. As shown in FIG. 3, the housing 35 includes a first housing segment 41 and a second housing segment 42. The second housing segment 42 will be also referred to as a case 42. The first housing segment 41 and the second housing segment 42 are made of a metal material, such as aluminum, an aluminum alloy or iron steel. Alternatively, the first housing segment 41 and the second housing segment 42 may be made of resin. Furthermore, the first housing segment 41 and the second housing segment 42 may be formed by any manufacturing method among die casting, gravity casting, injection molding or press working. The second housing segment 42 is joined to the first housing segment 41 by fastening members 43. An output shaft 26 projects from the second housing segment 42 and is coupled to the actuator lever 27.

Figure 4:
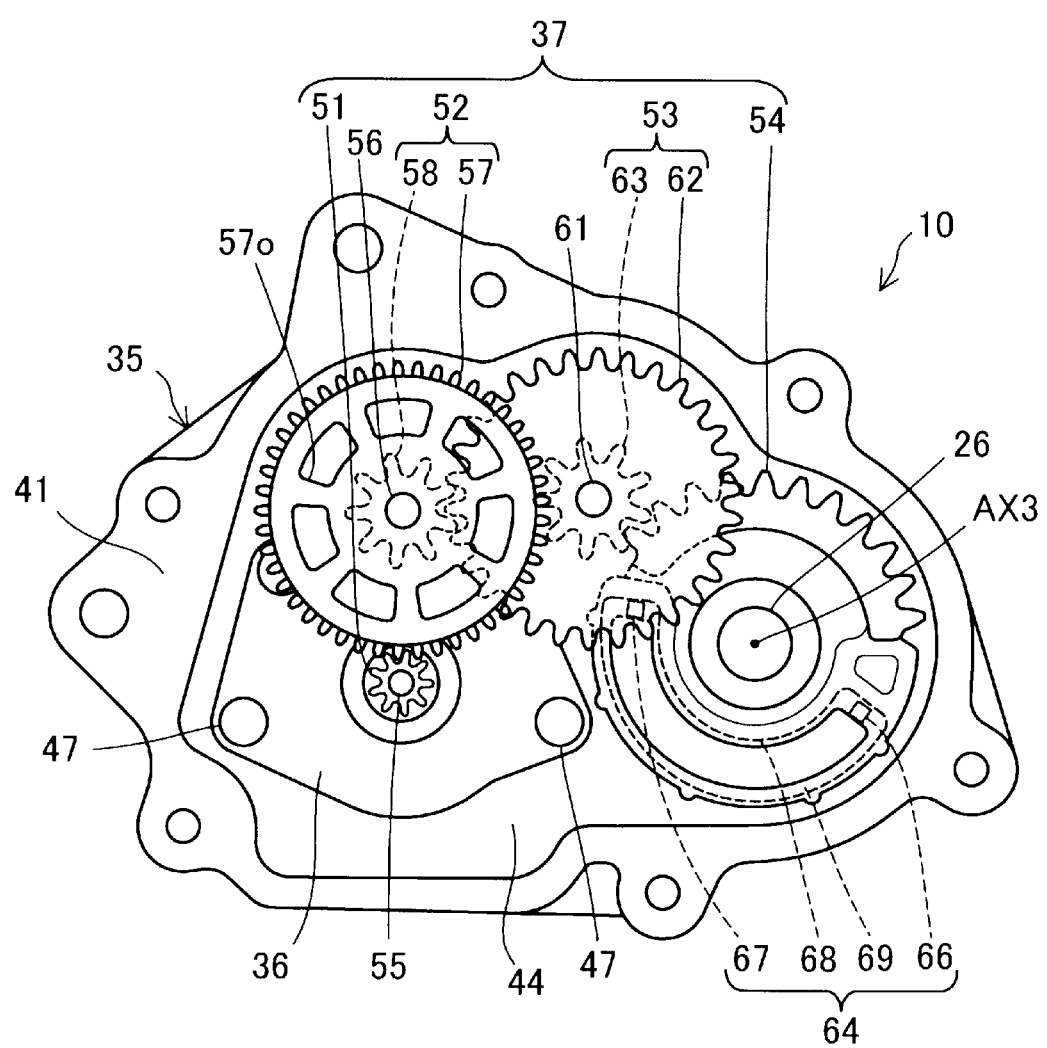
FIG. 4 is a descriptive diagram indicating respective gears of a speed reducer of the first embodiment.
Figure 5:
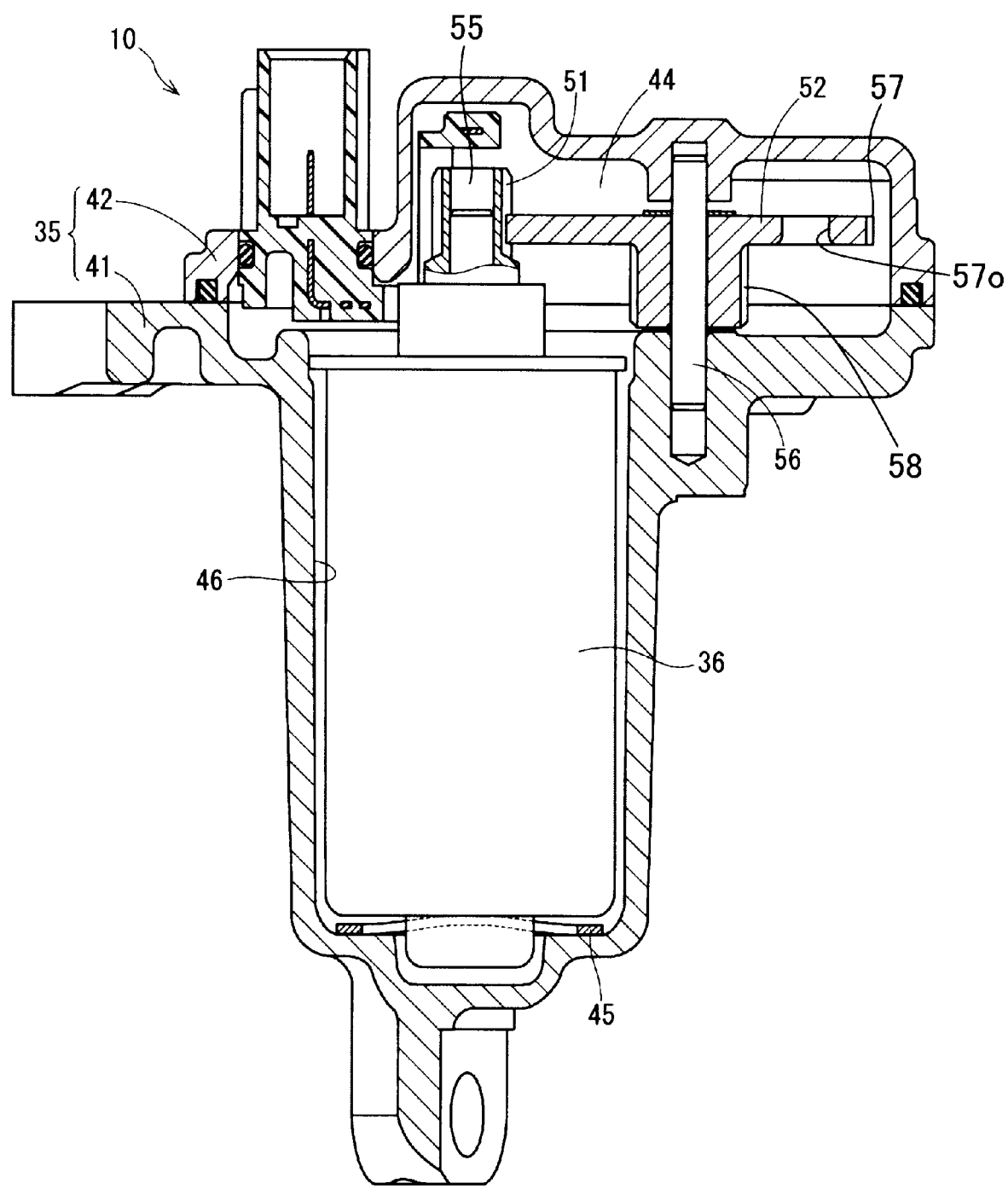
FIG. 5 is a cross-sectional view taken along line V-V in FIG. 3.

As shown in FIGS. 4 and 5, the first housing segment 41 and the second housing segment 42 cooperate together to form a receiving space 44 therein. An electric motor 36 is received in the receiving space 44. Specifically, the electric motor 36 is inserted into a motor insertion hole 46 formed at the first housing segment 41 and is fixed to the first housing segment 41 by screws 47. A wave washer 45 is installed between the electric motor 36 and a bottom surface of the motor insertion hole 46. The wave washer 45 may be eliminated if desired. The electric motor 36 may be any type of electric motor, such as a known DC motor, a known stepping motor or the like.

Figure 6:
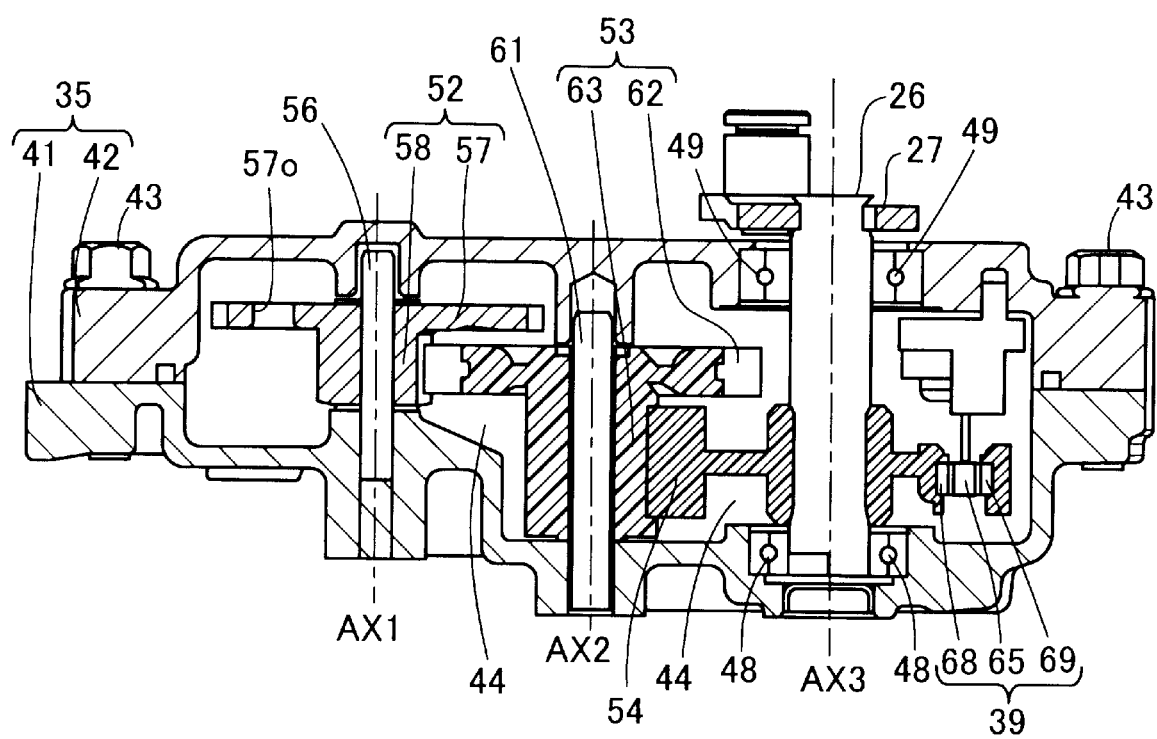
FIG. 6 is a cross-sectional view taken along line VI-VI in FIG. 3.

As shown in FIGS. 4 and 6, the actuator 10 includes the speed reducer 37. The speed reducer 37 is a parallel shaft speed reducer that reduces the speed of the rotation outputted from the electric motor 36 and transmits the rotation of the reduced speed to the output shaft 26. The speed reducer 37 includes a plurality of gears. In the present embodiment, the plurality of gears of the speed reducer 37 includes a pinion gear 51, a first intermediate gear 52, a second intermediate gear 53 and an output gear 54.

The pinion gear 51 is fixed to the motor shaft 55 of the electric motor 36. The pinion gear 51 is a metal gear made of metal. For example, iron-based sintered metal is used as this metal.

The first intermediate gear 52 is a compound gear that includes a first large diameter external gear 57 and a first small diameter external gear 58, and the first intermediate gear 52 is rotatably supported by a first metal shaft 56. The first intermediate gear 52 is configured to rotate about the first metal shaft 56 that is a shaft of the first intermediate gear 52. The first large diameter external gear 57 is a large diameter gear (or simply referred to as a large gear) and is meshed with the pinion gear 51 that is fixed to the motor shaft 55 of the electric motor 36. The first small diameter external gear 58 is a small diameter gear (or simply referred to as a small gear) that has a diameter, which is smaller than that of the first large diameter external gear 57. The first large diameter external gear 57 and the first small diameter external gear 58 are metal gears made of metal. For example, iron-based sintered metal is used as this metal. The first large diameter external gear 57 has a plurality of openings 57o to reduce the inertia of the first large diameter external gear 57.

The second intermediate gear 53 is a compound gear that includes a second large diameter external gear 62 and a second small diameter external gear 63, and the second intermediate gear 53 is rotatably supported by a second metal shaft 61. The second intermediate gear 53 is configured to rotate about the second metal shaft 61 that is a shaft of the second intermediate gear 53. The second large diameter external gear 62 is a large diameter gear and is meshed with the first small diameter external gear 58 of the first intermediate gear 52. The second large diameter external gear 62 is a metal gear made of metal. For example, iron-based sintered metal is used as this metal. The second small diameter external gear 63 is a small diameter gear that has a diameter smaller than that of the second large diameter external gear 62. Furthermore, the second small diameter external gear 63 is a resin gear that is made of resin. For example, polyamide resin, nylon resin or the polyacetal resin may be used as the resin. The resin gear has the smaller inertia in comparison to the metal gear. Therefore, in a case where the large impact load is applied to the second intermediate gear 53 by the pulsation of the exhaust gas pressure of the engine 11 through the wastegate valve 19, the valve lever 29, the rod 28, the actuator lever 27, the output shaft 26 and the output gear 54, it is possible to limit or minimize the transmission of the impact load to the second intermediate gear 53 and the gears, such as the first intermediate gear 52 and the pinion gear 51, which are located on the upstream side (the motor side) of the second intermediate gear 53. Furthermore, since the output gear 54 is formed as the resin gear, it is possible to limit or minimize the transmission of the impact load to the output gear 54 and the gears, such as the second intermediate gear 53, the first intermediate gear 52 and the pinion gear 51, which are located on the upstream side (the motor side) of the output gear 54.

The output gear 54 is meshed with the second small diameter external gear 63, and the output shaft 26 is coupled to and is fixed to the output gear 54 along a central axis AX3 of the output gear 54. The central axis AX3 may be simply referred to as an axis AX3. Also, a central axis AX1 of the first intermediate gear 52 and a central axis Ax2 of the second intermediate gear 53 may be also referred to as an axis AX1 and an axis Ax2, respectively. The output gear 54 is a resin gear made of resin. Therefore, in the first embodiment, the pinion gear 51, the first large diameter external gear 57, the first small diameter external gear 58 and the second large diameter external gear 62, which are located at the upstream side in the transmission path between the electric motor 36 and the output shaft 26, are the metal gears, and the second small diameter external gear 63 and the output gear 54, which are located at the downstream side in the transmission path, are the resin gears. Specifically, among the gears of the speed reducer 37, the gears, which are other than the output gear 54 and the second small diameter external gear 63 of the second intermediate gear (the compound gear) 53 meshed with the output gear 54, are the metal gears. Therefore, the meshing between the gears is limited to the meshing between the resin gears and the meshing between the metal gears, and there is no meshing between the resin gear and the metal gear. Thereby, it is possible to limit wearing of the resin gears.

As shown in FIGS. 5 and 6, the actuator 10 includes: the first housing segment (also simply referred to as a housing) 41, which receives the electric motor 36, the output shaft 26 and the speed reducer 37; and the second housing segment 42, which is also referred to as the case and is installed to the first housing segment 41 to cover the inside of the first housing segment 41. One end portion of the second metal shaft 61 is fixed to the first housing segment 41, and the other end portion of the second metal shaft 61 is supported by the second housing segment 42. Thus, in comparison to a case where the one end portion of the second metal shaft 61 is fixed to the first housing segment 41, and the other end portion of the second metal shaft 61 is not supported, it is possible to reduce the deformation of the second metal shaft 61 that is caused by vibration and/or torque generated by the operation of the electric motor 36 and/or the pulsation transmitted from the wastegate valve 19.

Magnets (serving as magnetic flux generators) 66, 67 and yokes (serving as magnetic flux conductors) 68, 69 are installed to the output gear 54. The magnets 66, 67 and the yokes 68, 69 form a magnetic circuit device 64 that forms a closed magnetic circuit and is shaped in an arcuate form in a view taken in an axial direction of the output shaft 26. The magnetic circuit device 64 is rotated integrally with the output gear 54 and the output shaft 26.

A magnetic flux sensing device 65, which senses a magnetic flux generated from the magnets 66, 67, is installed at an inside of the closed magnetic circuit of the magnetic circuit device 64 of the output gear 54. For example, a Hall IC is used to form the magnetic flux sensing device 65. The magnetic circuit device 64 and the magnetic flux sensing device 65 function as a rotational angle sensor 39 that senses a rotational angle of the output shaft 26. The basic applications and functions of the magnetic circuit device 64 and the magnetic flux sensing device 65 are the same as those disclosed in JP2014-126548A (corresponding to US2014/0184204A, the disclosure of which is incorporated herein by reference in its entirety). The rotational angle of the output shaft 26, which is sensed with the rotational angle sensor 39, is outputted to the ECU 22 (see FIG. 1). The structures of the magnetic circuit device 64 and the magnetic flux sensing device 65 shown in FIG. 6 are only one example, and the magnetic circuit device 64 and the magnetic flux sensing device 65 may have another type of structures.

As shown in FIG. 6, the output shaft 26 is rotatably supported by a bearing 48, which is installed to the first housing segment 41, and a bearing 49, which is installed to the second housing segment 42. One end portion of the output shaft 26 outwardly projects from the second housing segment 42 of the housing 35. The actuator lever 27 is fixed to the output shaft 26 at the outside of the second housing segment 42.

Figure 7:
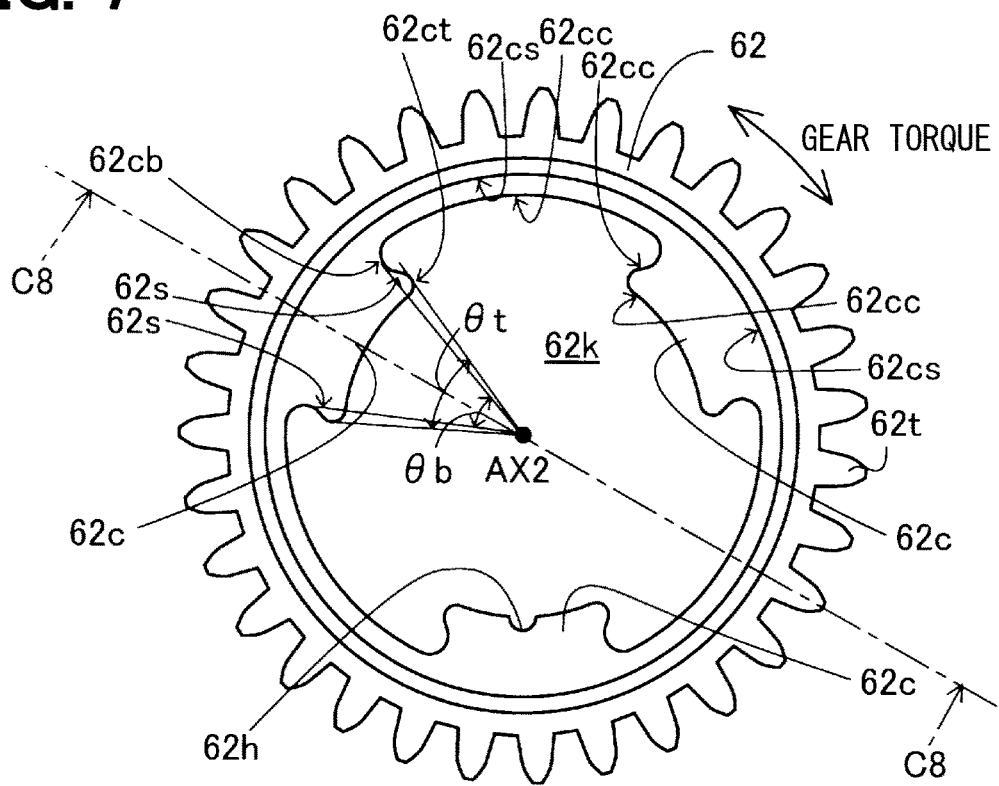
FIG. 7 is a plan view of a second large diameter external gear of a second intermediate gear of the first embodiment seen in an axial direction.
Figure 8:
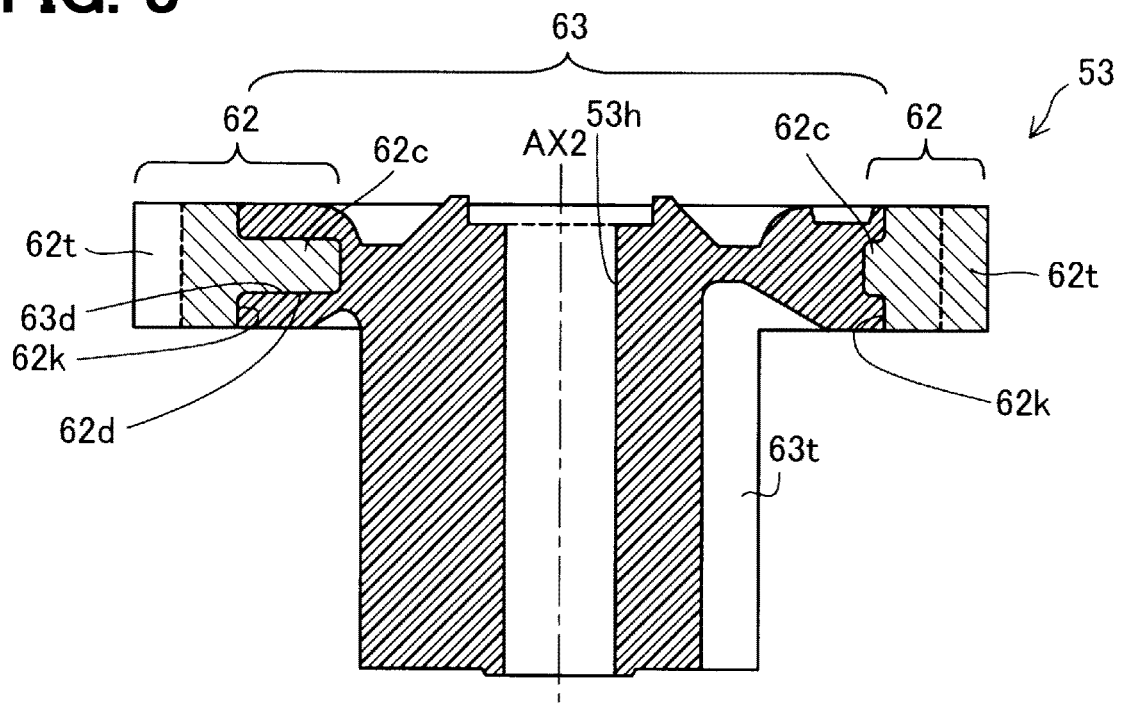
FIG. 8 is a cross-sectional view of the second intermediate gear of the first embodiment.

FIG. 7 is a plan view of the second large diameter external gear 62 seen in an axial direction of the axis AX2. FIG. 8 is a descriptive diagram showing a cross section of the second intermediate gear 53 taken along line C8-C8 in FIG. 7 after resin molding of the second small diameter external gear 63 with the second large diameter external gear 62. The second large diameter external gear 62 includes: a plurality of large gear teeth 62t, which are formed along an outer periphery of the second large diameter external gear 62; an opening 62k, which opens at a center of the second large diameter external gear 62; and three projections 62c, which are circumferentially arranged and project into the opening 62k. As shown in FIG. 8, the resin, which forms the second small diameter external gear 63, is applied into the opening 62k. This structure will be described later. Each of the projections 62c shown in FIG. 7 has two action surfaces 62s, which are circumferentially opposite to each other. The action surface 62s is a surface that applies a force, which is other than a frictional force, to the second small diameter external gear 63 in a rotational direction or receives a force, which is other than the frictional force, from the second small diameter external gear 63 in the rotational direction. The action surface 62s is a surface that is not parallel to the rotational direction of the second large diameter external gear 62. The action surfaces 62s can limit relative movement between the second large diameter external gear 62 and the second small diameter external gear 63 upon application of the force to limit occurrence of wearing. Although it is preferred to have the action surfaces 62s, the action surfaces 62s may be eliminated depending on a need. For instance, in a case where the shape of the projection 62c is changed to a shape of an inner flange, a boundary between the second large diameter external gear 62 and the second small diameter external gear 63 is parallel to the rotational direction of the second large diameter external gear 62, and thereby the action surface does not exist. However, in such a case, the second large diameter external gear 62 and the second small diameter external gear 63 tightly contact with each other, so that a static frictional force is exerted between the second large diameter external gear 62 and the second small diameter external gear 63. Thus, relative movement between the second large diameter external gear 62 and the second small diameter external gear 63 can be limited by the static frictional force.

Figure 9:
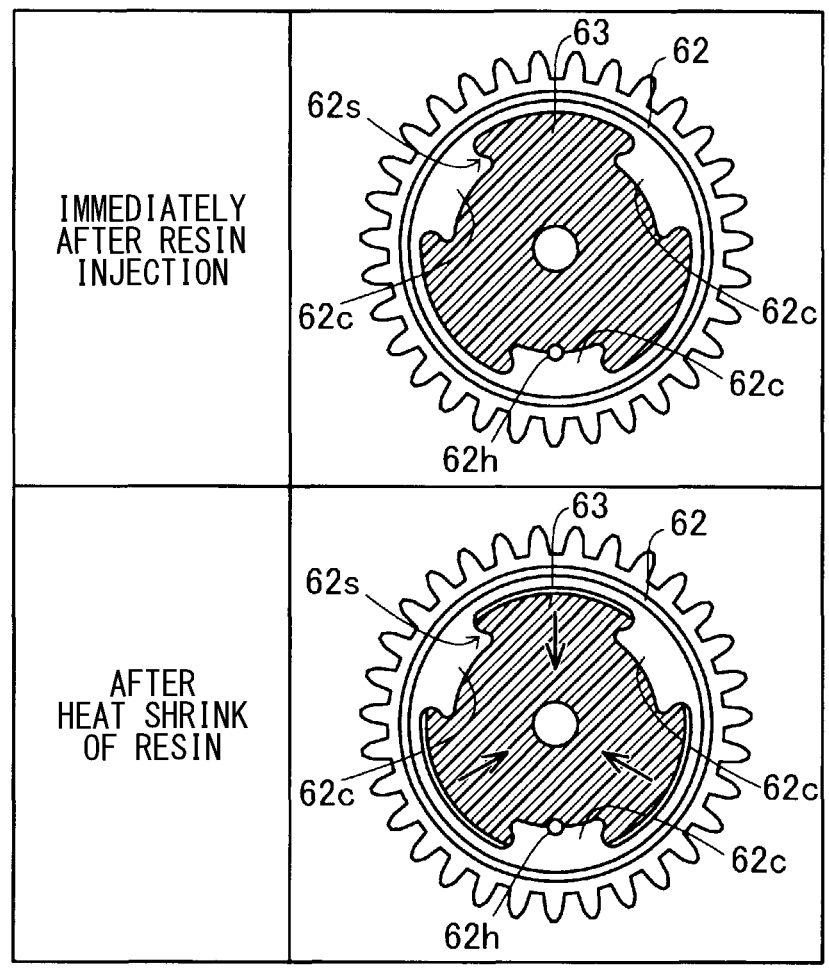
FIG. 9 is a diagram for describing a change in resin of a second small diameter external gear of the second intermediate gear in a case where projections of the second large diameter external gear are constricted according to the first embodiment.

As shown in FIG. 7, the action surfaces 62s of the projection 62c have a constricted shape where a root side of the action surfaces 62s, at which a root 62cb of the projection 62c is located, is constricted (circumferentially recessed) relative to a distal side of the action surfaces 62s, at which a distal end part 62ct of the projection 62c is located. The constricted shape, in which the root 62cb is constricted relative to the distal end part 62ct, means that when the projection 62c is viewed from the axis AX2, a central angle θb of the root 62*cb* is smaller than a central angle θt of the distal end part 62*ct*. The constricted shape discussed above may also mean that a circumferential width of the root 62*cb* of the projection 62*c* is smaller than a circumferential width of the distal end part 62*ct*. In the case where the root 62*cb* is constricted at the projection 62*c*, as shown in FIG. 9, when the resin is cured, the resin, which is shrunk, more closely contacts the projection 62*c*, and thereby generation of a gap between the second large diameter external gear 62 and the second small diameter external gear 63 at the action surface 62*s* can be limited. Also, it is possible to limit rattling or damage of the connection between the resin gear and the metal gear, which would be caused by generation of a gap at the connection upon application of a stress to the connection in response to a temperature change, application of torque, or generation of vibration. For example, in the case where the resin is integrally molded to the metal gear, a resin crack caused by a thermal shock may possibly be generated at the connection between the resin and the metal by a stress generated at the connection due to a difference in the linear expansion coefficient between the resin and the metal, or a stress oscillation generated through repeating high and low temperatures. The projection 62*c* having the constricted root 62*cb* can limit the generation of the stress and the resin crack. Furthermore, in a case where the product is left for a long period of time under the high temperature, the resin may undergo high-temperature creep deformation at a stress generating portion, and thereby a gap may be generated between the resin and the metal. The projection 62*c* having the constricted root 62*cb* can limit generation of this gap between the resin and the metal. Furthermore, in a case where a torque is applied to the gear, damage may be generated by fatigue failure at the stress concentrating portion at the contact between the resin and the metal. The projection 62*c* having the constricted root 62*cb* can limit generation of this damage. Furthermore, when a torque or vibration is applied to the gear, relative sipping may be generated at the connection between the resin and the metal to cause wearing of the resin or the metal, which in turn causes generation of a gap at the connection between the resin and the metal. The projection 62*c* having the constricted root 62*cb* can limit generation of this gap. Alternatively, the action surfaces 62*s* of the projection 62*c* may not have the constricted shape, in which the root 62*cb* of the projection 62*c* is constricted relative to the distal end part 62*ct* of the projection 62*c*. Furthermore, one of the three projections 62*c* has a positioning portion 62*h*, which will be described later. A convex corner 62*cc* and a concave corner 62*cs* are formed at a boundary between the opening 62*k* and the projection 62*c* along an inner periphery of the opening 62*k*. In this instance, the convex corner 62*cc* and the concave corner 62*cs* extend all around along the inner periphery of the opening 62*k*. The convex corner 62*cc* and the concave corner 62*cs* will be described later.

As shown in FIG. 8, the second small diameter external gear 63, which is the resin gear, is formed integrally in one piece with the second large diameter external gear 62, which is the metal gear. The second small diameter external gear 63 holds each projection 62*c*, which is a portion of a metal member (metal body) of the second large diameter external gear 62, in the axial direction of the axis AX2 from two opposite axial sides of the projection 62*c*. Here, the expression of "the resin gear is formed integrally with the metal gear in one piece" refers that the second small diameter external gear 63, which is the resin gear, is formed as a single piece that cannot be disassembled without breaking it through the resin injection molding, and the second small diameter external gear 63 is joined to the second large diameter external gear 62, which is the metal gear, without forming a gap between the second small diameter external gear 63 and the second large diameter external gear 62. Besides the injection molding, any of various resin molding methods, such as lamination molding, powder molding, may be employed as the resin molding method of the present embodiment. Each of the projections 62*c* has a contact surface 62*d* at each of two opposite axial sides of the projection 62*c*. At each of the two opposite axial sides of the projection 62*c*, the contact surface 62*d* contacts the second small diameter external gear 63 in the axial direction of the axis AX2. Also, the second small diameter external gear 63 has a plurality of contact surfaces 63*d*, each of which contacts the corresponding contact surface 62*d* of the corresponding projection 62*c*. Furthermore, at each of the two opposite axial side of each projection 62*c*, the contact surface 62*d* and the contact surface 63*d* contact with each other without forming a gap between the contact surface 62*d* and the contact surface 63*d*. In general, when the metal gear and the resin gear are separately manufactured and thereafter assembled together, a gap may be generated between the metal gear and the resin gear depending on the manufacturing accuracy. However, since the second intermediate gear 53 of the present embodiment includes the second small diameter external gear 63, which is the integrally molded resin gear, the second large diameter external gear 62, which is the metal gear, and the second small diameter external gear 63 can be joined together without forming a gap therebetween regardless of the manufacturing accuracy of the second large diameter external gear 62. Further, the resin is in close contact with the metal, so that even when the temperature of the second intermediate gear 53 changes or when the gear torque or vibration applied to the second intermediate gear 53 changes, it is difficult for a gap to be formed between the second large diameter external gear 62 and the second small diameter external gear 63, and thereby durability of the second intermediate gear 53 can be improved. In addition, when the resin of the second small diameter external gear 63 is shrunk, for example, under the low temperature, after the molding of the second small diameter external gear 63, the resin of the second small diameter external gear 63 is shrunk in a direction for reducing the gap between the projection 62*c* of the second large diameter external gear 62 and the resin.

As shown in FIG. 8, the projection 62*c* is held by the resin in the axial direction of the axis AX2 from the two opposite axial sides of the projection 62*c*. Therefore, it is possible to limit detachment between the second large diameter external gear 62 and the second small diameter external gear 63 in the thrust direction, i.e., the axial direction of the axis AX2. As a result, the reliability of the second intermediate gear 53 with respect to the load and vibration applied in the axial direction of the axis AX2 can be improved. In addition, it is preferable to employ the structure, in which the projection 62*c* is held by the resin in the axial direction of the axis AX2 from the two opposite axial sides of the projection 62*c*. In the case where the projection 62*c* is held by the resin in the axial direction of the axis AX2 from the two opposite axial sides of the projection 62*c*, when the resin of the second small diameter external gear 63 is shrunk, for example, under the low temperature, after the molding of the second small diameter external gear 63, the resin of the second small diameter external gear 63 is shrunk in the direction for reducing the gap between the projection 62*c* of the second large diameter external gear 62 and the resin. Alternatively, the structure, in which the projection 62c is held by the resin in the axial direction of the axis AX2 from the two opposite axial sides of the projection 62c, may not be used. Specifically, there may be used a structure, in which the resin exists only at the surface of one of the two opposite axial sides of the projection 62c. Furthermore, the projections 62c may be axially staggered in the axial direction of the axis AX2 such that the resin exists only on the small gear teeth 63t side of one of the projections 62c in one axial cross section of the second intermediate gear 53, and the resin exists only on the opposite side of another one of the projections 62c, which is axially opposite to the small gear teeth 63t side in another axial cross section of the second intermediate gear 53, which is circumferentially displaced from the one axial cross section of the second intermediate gear 53.

Figure 10:
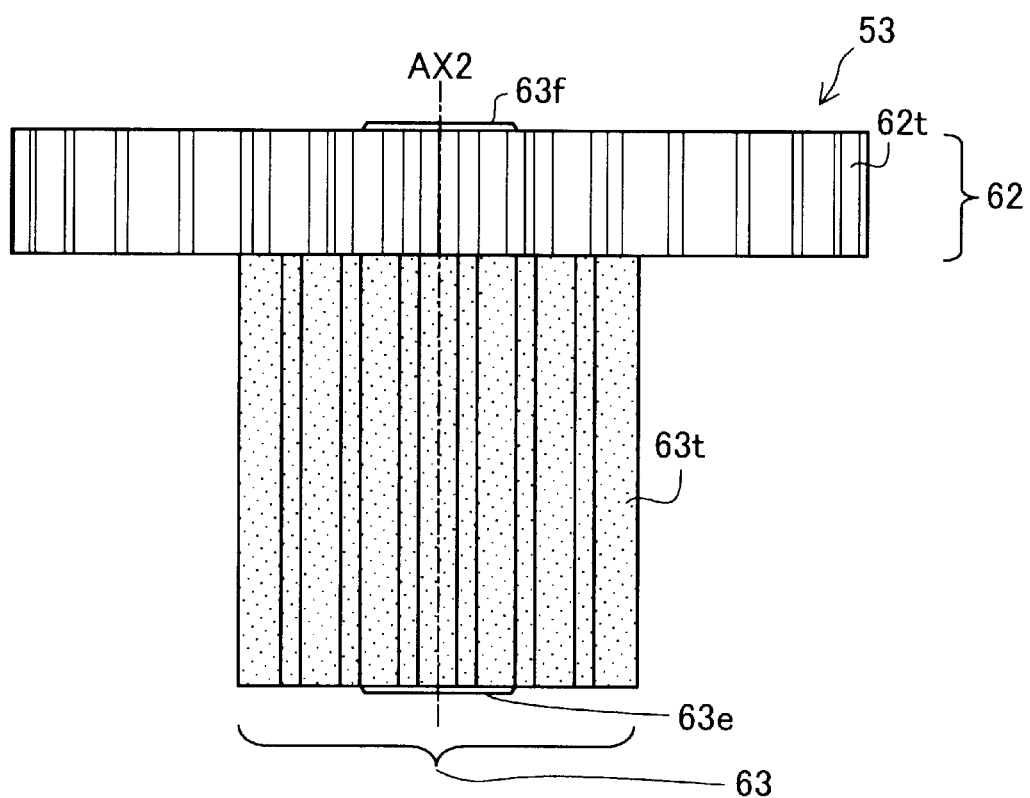
FIG. 10 is a front view of the second intermediate gear of the first embodiment seen in a direction perpendicular to a central axis, which serves as a rotational center of the second intermediate gear.
Figure 11:
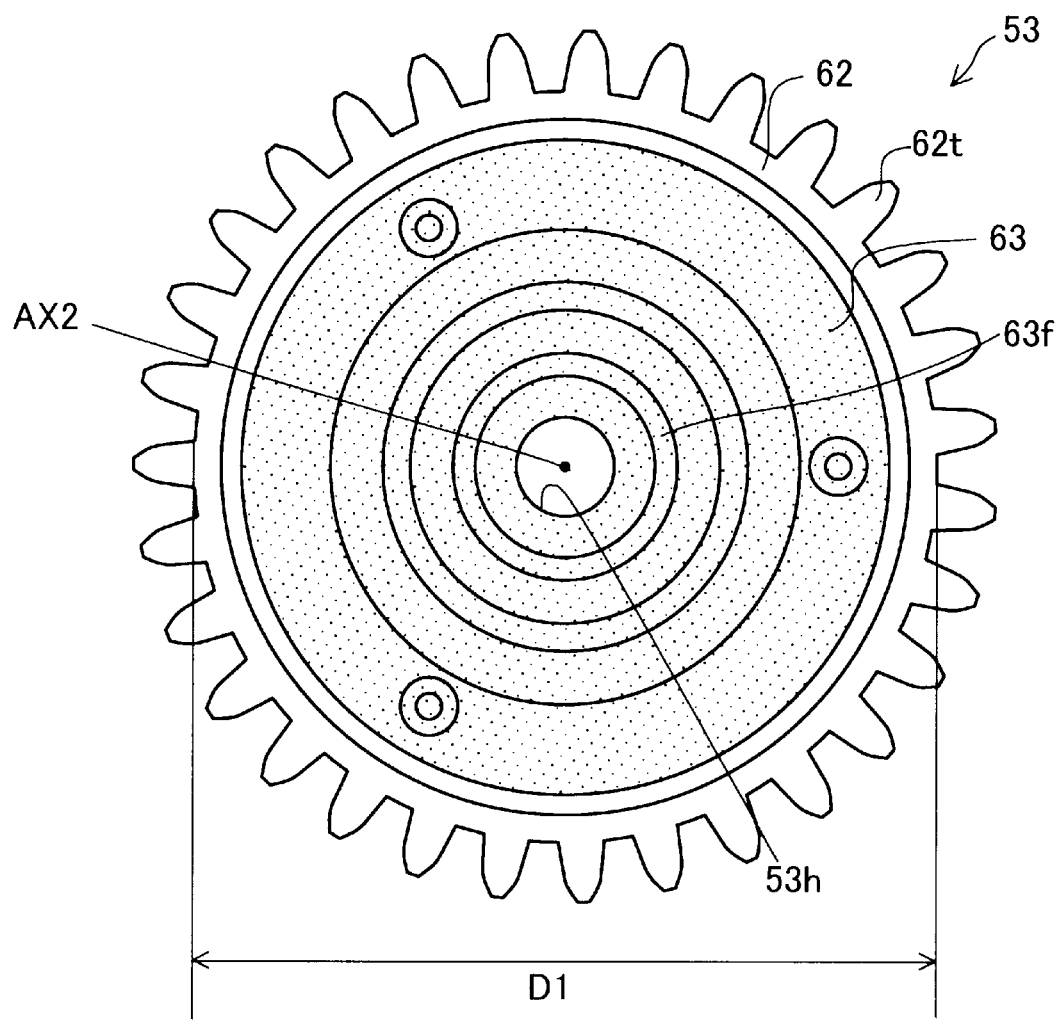
FIG. 11 is a top view of the second intermediate gear of the first embodiment seen from a second housing segment side.
Figure 12:
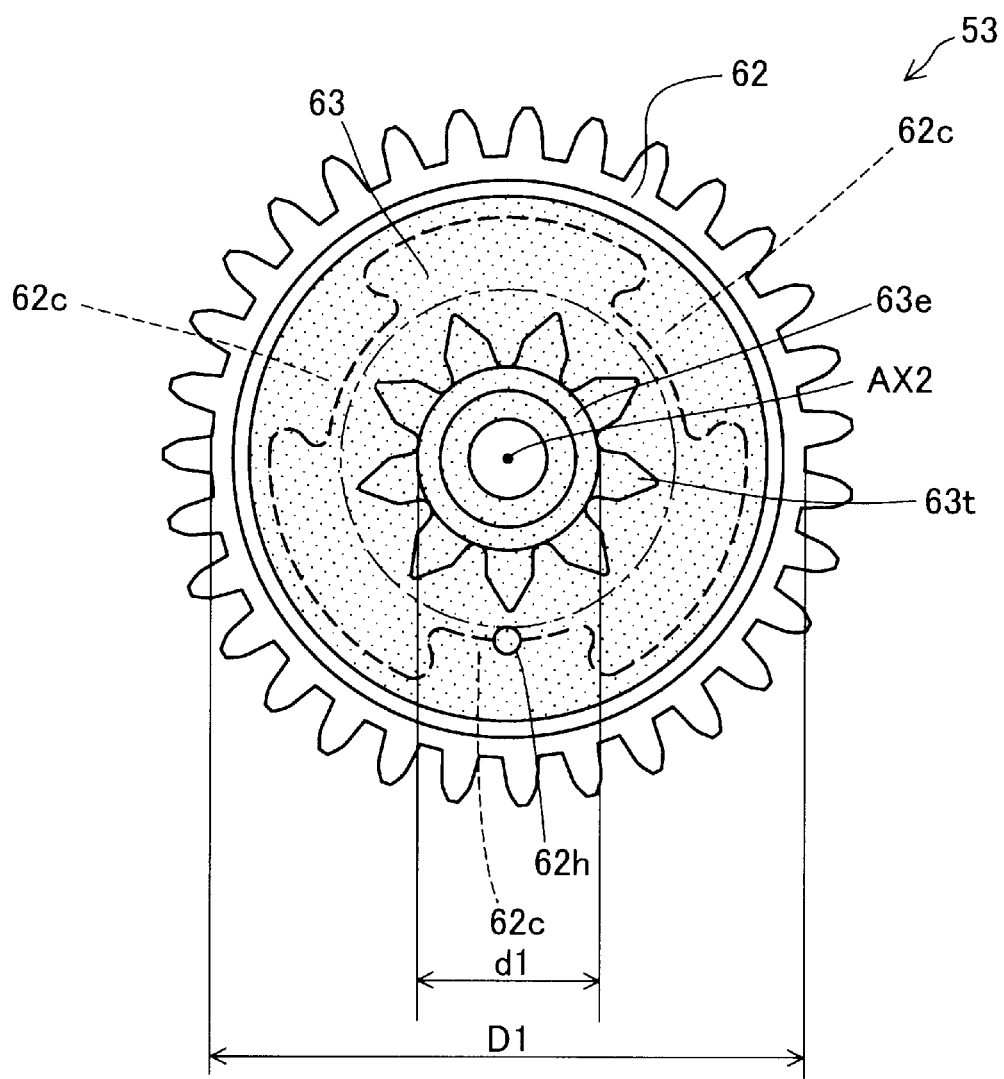
FIG. 12 is a bottom view of the second intermediate gear of the first embodiment seen from a first housing segment side.

FIG. 10 is a front view of the second intermediate gear 53 seen in a direction perpendicular to the central axis AX2, which serves as the rotational center of the second intermediate gear 53. FIG. 11 is a plan view of the second intermediate gear 53 seen from the second housing segment 42 side in the axial direction of the axis AX2. FIG. 12 is a bottom view of the second intermediate gear 53 seen from the second housing segment 42 side in the axial direction of the axis AX2. The second intermediate gear 53 includes: the second large diameter external gear 62, which is the metal gear and is placed at the outer side of the second intermediate gear 53; and the second small diameter external gear 63, which is the resin gear and is placed at the inner side of the second intermediate gear 53. The second small diameter external gear 63 projects from the second large diameter external gear 62 toward the first housing segment 41 side. As discussed above, the second large diameter external gear 62 includes the large gear teeth 62t at the outer periphery of the second large diameter external gear 62. Here, the large gear teeth refers to teeth of the large diameter gear (large gear), i.e., the second large diameter external gear 62 regardless of the material thereof. As shown in FIGS. 10 and 12, the second small diameter external gear 63 includes a plurality of small gear teeth 63t located at a projecting portion of the second small diameter external gear 63, which projects from the second large diameter external gear 62 toward the first housing segment 41. Here, the small gear teeth refers to teeth of the small diameter gear (small gear), i.e., the second small diameter external gear 63 regardless of the material thereof.

The second small diameter external gear 63 has an axis hole 53h, through which the second metal shaft 61 is inserted. By forming the axis hole 53h at the second small diameter external gear 63, which is the resin gear, the number of the components of the actuator 10 can be reduced, and the number of assembling steps of the actuator 10 can be reduced. As shown in FIG. 11, the second small diameter external gear 63 has an end surface 63f within a range of a dedendum circle diameter D1 of the large gear teeth 62t at an end portion of the second small diameter external gear 63 located on the second housing segment 42 side in the axial direction of the axis AX2. Furthermore, as shown in FIG. 12, the second small diameter external gear 63 has an end surface 63e within a range of a dedendum circle diameter d1 of the small gear teeth 63t at another end portion of the second small diameter external gear 63 located on the first housing segment 41 side. Since the second small diameter external gear 63 has the end surfaces 63e, 63f, it is possible to limit contacting of the large gear teeth 62t of the second large diameter external gear 62 to the second housing segment 42 and contacting of the small gear teeth 63t of the second small diameter external gear 63 to the first housing segment 41.

Figure 13:
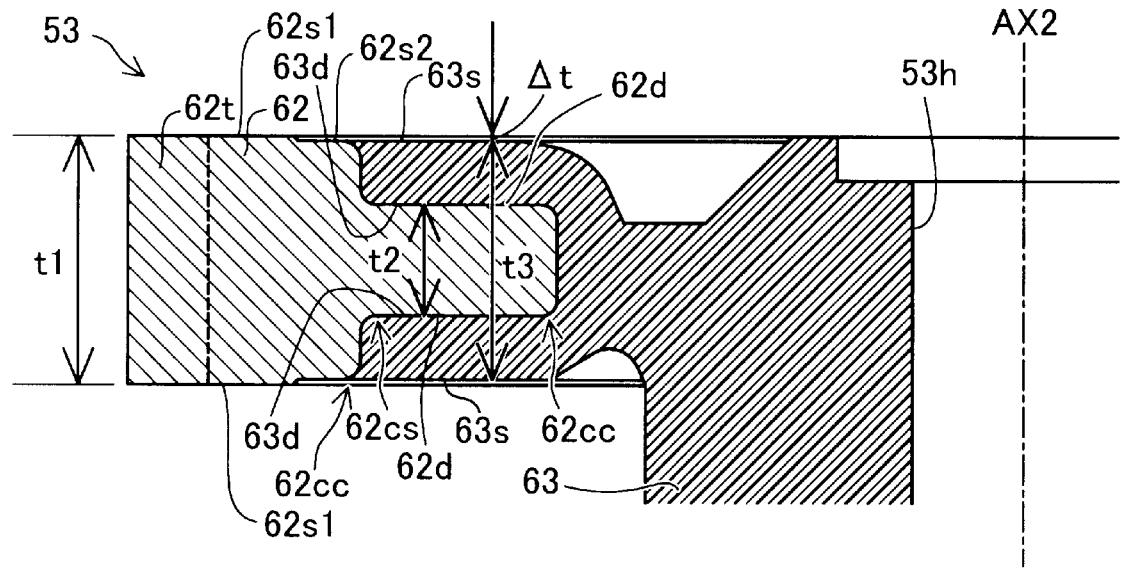
FIG. 13 is a descriptive diagram for describing a thickness of the projection of the second large diameter external gear of the first embodiment.

A thickness of the projection 62c will now be described with reference to FIG. 13. Here, it is assumed that a thickness (measured in the axial direction of the axis AX2) of the large gear teeth 62t of the second large diameter external gear 62 is indicated by t1; a thickness (measured in the axial direction of the axis AX2) of the projection 62c, which is a portion that is joined to the resin of the second small diameter external gear 63, is indicated by t2; and a thickness (measured in the axial direction of the axis AX2) of a fitting portion, at which a resin member (resin body) of the second small diameter external gear 63 and the projection 62c are fitted together, is indicated by t3. In such a case, the second intermediate gear 53 satisfies a relationship of t1>t2 and t1≥t3. Furthermore, the fitting portion does not extend in the axial direction of the axis AX2 beyond two end surfaces 62s1 of the second large diameter external gear 62, which are opposed to each other in the axial direction of the axis AX2 and extend in a direction perpendicular to the axis AX2. In FIG. 13, although the measurement location of t2 and the measurement location of t3 are different from each other for the sake of convenience, the measurement location of t2 and the measurement location of t3 are the same location in reality. Furthermore, in this structure, the resin member of the second small diameter external gear 63 holds the projection 62c in the axial direction of the axis AX2 from the two opposite axial sides of the projection 62c at a location between the two end surfaces 62s1 of the second large diameter external gear 62, which are opposed to each other in the axial direction of the axis AX2. With this structure, it is possible to limit an interference between the second small diameter external gear 63, which is the resin gear, and the output gear 54, which is a mating gear that is meshed with the second small diameter external gear 63. Furthermore, a width of the large gear teeth 62t of the second large diameter external gear 62 and a width of the gear teeth of the output gear 54 can be increased to strengthen the gear teeth. Although it is preferable to satisfy the relationship of t1>t2 and t1≥t3, it is not absolutely necessary to satisfy this relationship.

In FIG. 13, at the projection 62c, the convex corner 62cc and the concave corner 62cs are chamfered. The convex corner 62cc refers to a part that protrudes sharply when the projection 62c is viewed from the outside, and the concave corner 62cs refers to a part that protrudes sharply when the projection 62c is viewed from the inside. As shown in FIG. 7, the convex corner 62cc and the concave corner 62cs circumferentially extend all around along the inner periphery of the opening 62k. Therefore, a corresponding one of the convex corner 62cc and the concave corner 62cs is formed at the distal end part 62ct and the root 62cb of the projection 62c shown in FIG. 7 and is chamfered in a manner similar to the one described above. Here, the term "chamfering" refers to cutting of the convex corner 62cc or the concave corner 62cs by R-chamfering, C-chamfering or another angle. The R-chamfering refers to cutting an edge between two adjoining right-angled faces to a round surface at the convex corner 62cc or the concave corner 62cs. The C-chamfering refers to cutting an edge between two adjoining right-angled faces at a 45° at the convex corner 62cc or the concave corner 62cs. A stress tends to be concentrated at the convex corner 62cc or the concave corner 62cs, so that the stress can be alleviated by the chamfering. Further, it is possible to limit occurrence of cracking and fatigue failure of the resin that is in contact with the convex corner 62cc or the concave corner 62cs. Alternatively, the convex corner 62cc and/or the concave corner 62cs may not be chamfered.

As shown in FIG. 13, the second large diameter external gear 62 has end surfaces 62s1, 62s2 at each of two opposite axial sides thereof, which are opposite to each other in the axial direction of the axis AX2, and the second small diameter external gear 63 has an end surface 63s at each of two opposite axial sides of the portion of the second small diameter external gear 63 that holds the projection 62c from the two opposite axial sides of the projection 62c. At each of the two opposite axial sides of the second large diameter external gear 62, the end surfaces 62s1, 62s2 are stepped such that the end surface 62s2 is axially recessed from the end surface 62s1 toward the projection 62c side by the amount of Δt. Furthermore, at each of the two opposite axial sides of the second small diameter external gear 63, the end surface 63s is coplanar with the end surface 62s2.

Figure 14:
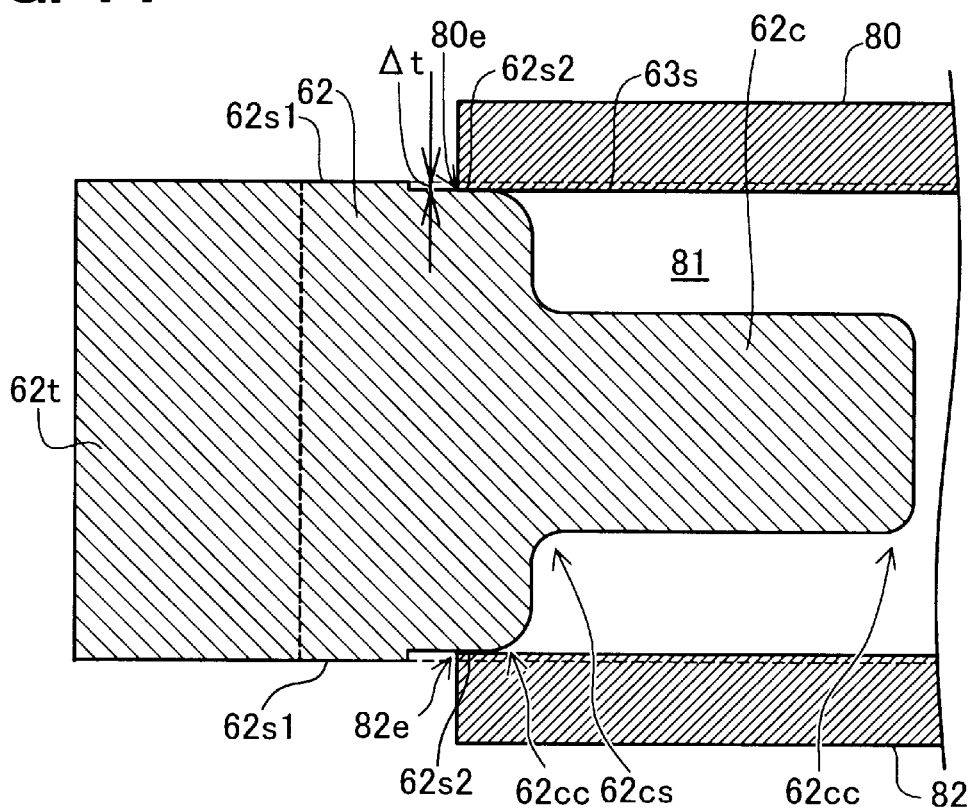
FIG. 14 is a descriptive diagram partially showing the second large diameter external gear and molding dies in a magnified scale at a time of forming the second small diameter external gear made of resin according to the first embodiment.

FIG. 14 is a descriptive diagram partially showing the second large diameter external gear 62 and the molding dies 80, 82 at the time of forming the second small diameter external gear 63 made of the resin. A space, which is defined between the molding dies 80, 82, is a cavity 81. Molten resin is filled in the cavity 81 and is cured in the cavity 81, so that the second small diameter external gear 63 is formed. As shown in FIG. 14, end parts 80e, 82e of the molding dies 80, 82 at the outer periphery of the molding dies 80, 82 respectively contact the two end surfaces 62s2 of the second large diameter external gear 62. Therefore, the molten resin, which is injected into the cavity 81, does not flow to the end surface 62s1 beyond the end surface 62s2 at each of the two opposite axial sides of the second large diameter external gear 62. Furthermore, since the size of the cavity, into which the molten resin flows, can be reduced, the sealing of the resin can be improved. Furthermore, at the time of resin sealing, a range, in which the flatness is required, i.e., a range of the end surface 63s can be reduced. Therefore, the productivity can be improved. The second large diameter external gear 62 may be configured such that instead of having the two end surfaces 62s1, 62s2 at each of the two opposite axial sides of the second large diameter external gear 62, only the end surface 62s1 may be formed at each of the two opposite axial sides of the second large diameter external gear 62 such that the end surface 62s1 is coplanar with the end surface 63s.

Figure 15:
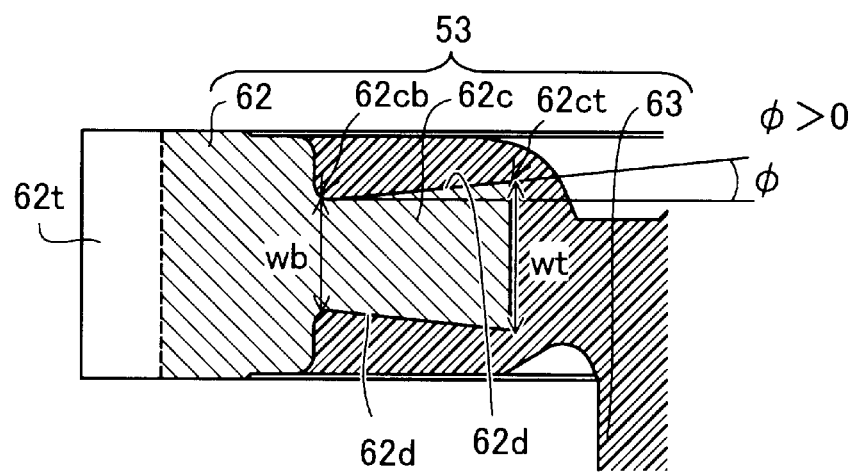
FIG. 15 is a descriptive diagram of a modification of the first embodiment, in which the projection has a tapered form.

FIG. 15 indicates a modification of the projection 62c. In the modification shown in FIG. 15, the projection 62c is configured such that a thickness wb of the root 62cb of the projection 62c, which is measured in the axial direction of the axis AX2, is smaller than a thickness wt of the distal end part 62ct of the projection 62c, which is measured in the axial direction of the axis AX2. For instance, in order to reduce the thickness wb relative to the thickness wt, each of the contact surfaces 62d of the projection 62c may be configured such that the contact surface 62d is tilted by an angle ϕ relative to a plane that is perpendicular the axis AX2. When the resin is shrunk, the shrunk resin more closely contacts the projection 62c, and thereby generation of a gap between the second large diameter external gear 62 and the second small diameter external gear 63 can be limited. The tapered form of each of the contact surfaces 62d is not necessarily limited to the linear form shown in FIG. 15 and may be changed to a concave surface form or a convex surface form. Furthermore, instead of the tapered form, a stair form may be used. Furthermore, the tapered form may be provided at only one or both of the two contact surfaces 62d. Furthermore, each of the projections 62c may be configured such that the thickness wt of the distal end part 62ct of the projection 62c measured in the axial direction of the axis AX2 and the thickness wb of the root 62cb of the projection 62c measured in the axial direction of the axis AX2 are equal to each other, or the thickness wt is smaller than the thickness wb. In the case where the thickness wt is equal to the thickness wb, the projection 62c can be easily formed by press working. Furthermore, when the thickness wt is smaller than the thickness wb, the positioning portion, which will be described later, can be easily formed at the distal end part 62ct of the projection 62c.

Figure 16:
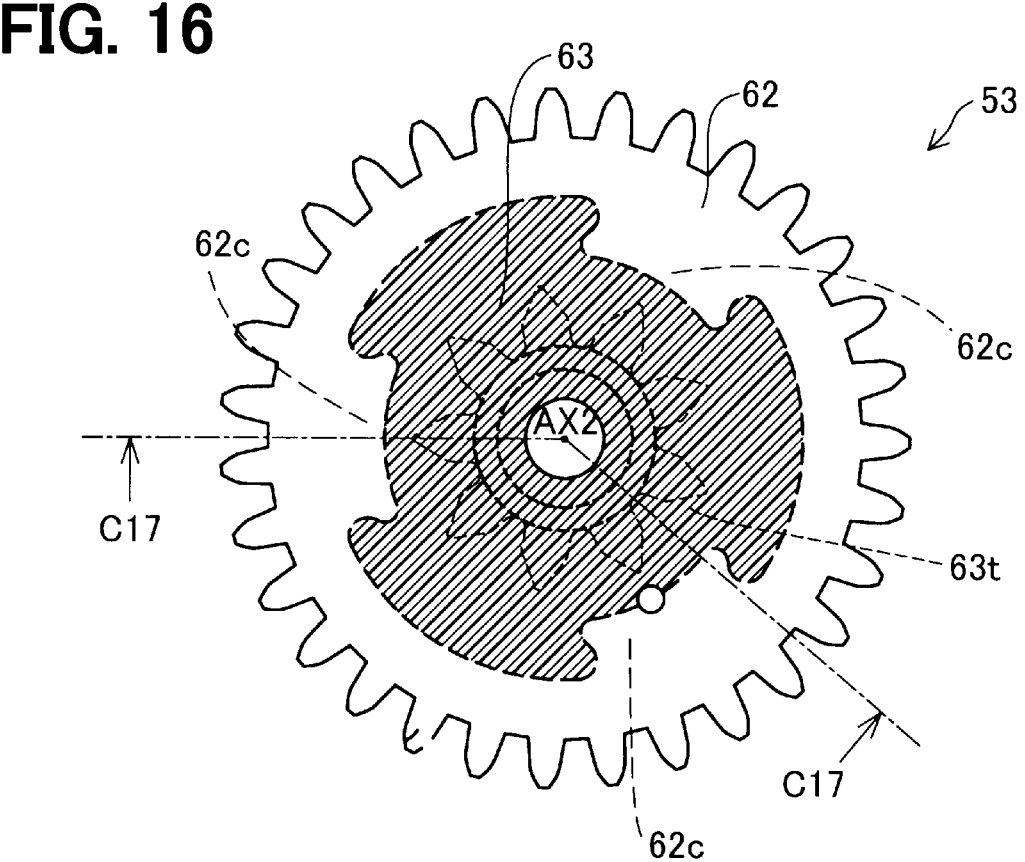
FIG. 16 is a descriptive diagram showing the second intermediate gear seen at a cross section of the second large diameter external gear according to the first embodiment.
Figure 17:
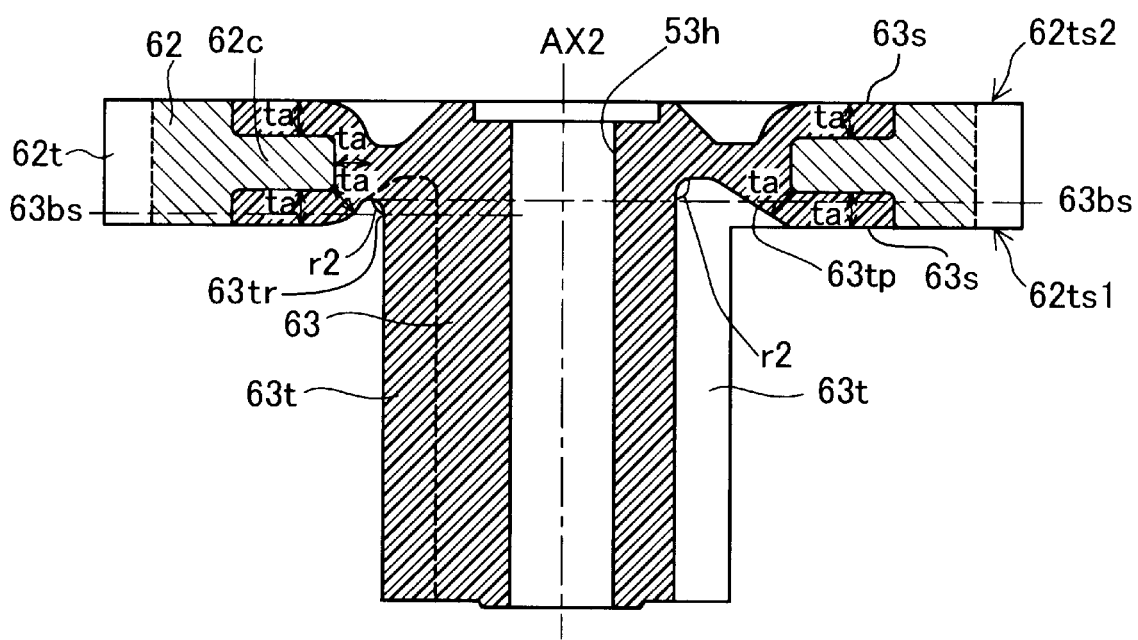
FIG. 17 is a cross-sectional view taken along line C17-C17 in FIG. 16 for describing a shape of respective roots of small gear teeth of the second small diameter external gear according to the first embodiment.

Next, with reference to FIGS. 16 and 17, the configuration of roots 63tr of the small gear teeth 63t of the second small diameter external gear 63, which is the resin gear, will be described. The root 63tr of each of the small gear teeth 63t, which is located at the second large diameter external gear 62 side, is also referred to as a round shaped portion that has a round shape in a longitudinal cross section thereof shown in FIG. 17. FIG. 17 is a cross-sectional view taken along line C17-C17 in FIG. 16. As shown in FIG. 16, the left side of line C17-C17 passes through a tooth tip of a corresponding one of the small gear teeth 63t, and the right side of line C17-C17 passes through a bottom land between corresponding adjacent two of the small gear teeth 63t. With reference to FIG. 17, if an end part 63bs of each of the small gear teeth 63t, which defines the curved surface (round surface having the round shape) that has a radius r2 at the root 63tr of the small gear tooth 63t, is located on the small gear teeth 63t side (the lower side in FIG. 17) of an end surface 62ts1 of the respective large gear teeth 62t, which is located on the small gear teeth 63t side (the lower side in FIG. 17), a face width of the respective small gear teeth 63t, which can be meshed with the other gear teeth, is disadvantageously reduced. Here, the face width is defined as a length of the small gear teeth 63t measured in the axial direction of the axis AX2. Therefore, it is desirable to place the end part 63bs on the opposite side (the upper side in FIG. 17) of the end surface 62ts1, which is opposite to the small gear teeth 63t side (the lower side in FIG. 17) and at which there is another end surface 62ts2 of each of the large gear teeth 62t that is opposite to the end surface 62ts1 in the axial direction of the axis AX2. Furthermore, in order to increase the bonding strength of the second small diameter external gear 63 relative to the second large diameter external gear 62, it is desirable to have a required thickness to of the resin of the second small diameter external gear 63. Furthermore, in order to strengthen the roots 63tr of the small gear teeth 63t, it is desirable to increase the radius r2. In order to satisfy the above demands, according to the present embodiment, as shown in FIG. 17, the second small diameter external gear 63, which is the resin gear, has a tapered portion 63tp that is axially progressively recessed in the lower end surface 63s of the second small diameter external gear 63 at the roots 63tr of the small gear teeth 63t, which are located at the second large diameter external gear 62 side of the small gear teeth 63t. The tapered portion 63t circumferentially extends all around the roots 63tr of the small gear teeth 63t. The surface of the tapered portion 63tp is progressively spaced away from the axis AX2 in the radial direction from the one axial side (the upper side in FIG. 17) toward the other axial side, i.e., the small gear teeth 63t side (the lower side in FIG. 17) in the axial direction of the axis AX2.

Since the second small diameter external gear 63 has the tapered portion 63tp as shown in FIG. 17, the bonding strength of the second small diameter external gear 63 relative to the second large diameter external gear 62 can be increased without reducing the face width of the respective small gear teeth 63t, which can be meshed with the other gear teeth, so that the strength of the roots 63tr of the small gear teeth 63t can be increased.

Next, the positioning portion 62h and the gate traces 63g will be described with reference to FIG. 18. When the second large diameter external gear 62, which is the metal gear, is installed to the molding dies 80, 82 (see FIG. 14), the positioning hole 62h is positioned to coincide with a location of a pin (not shown) of the molding dies 80, 82. The molten resin is filled into the cavity 81 through the gates (not shows) provided to the molding dies 80, 82. Since a surface of the molding die does not exist at the respective gates, traces of the gates are left on the resin. These traces are referred to as the gate traces (gate marks) 63g. When the second large diameter external gear 62, which is the metal gear, has the positioning portion 62h, the positioning of the second large diameter external gear 62 relative to the molding dies 80, 82 in the rotational direction of the second large diameter external gear 62 can be eased. At this time, when the positioning portion 62h is used for the positioning of the second large diameter external gear 62 in place, it is not required to use the large gear teeth 62t for the positioning of the second large diameter external gear 62. Therefore, it is possible to protect the large gear teeth 62t from scratches that would be otherwise generated through contact of the large gear teeth 62t with the pin. Furthermore, when the positioning portion 62h is used, the relative position among the large gear teeth 62t of the second large diameter external gear 62, the small gear teeth 63t of the second small diameter external gear 63 and the gates (the gate traces 63g) is defined, and the positioning accuracy of these components can be improved.

Figure 18:
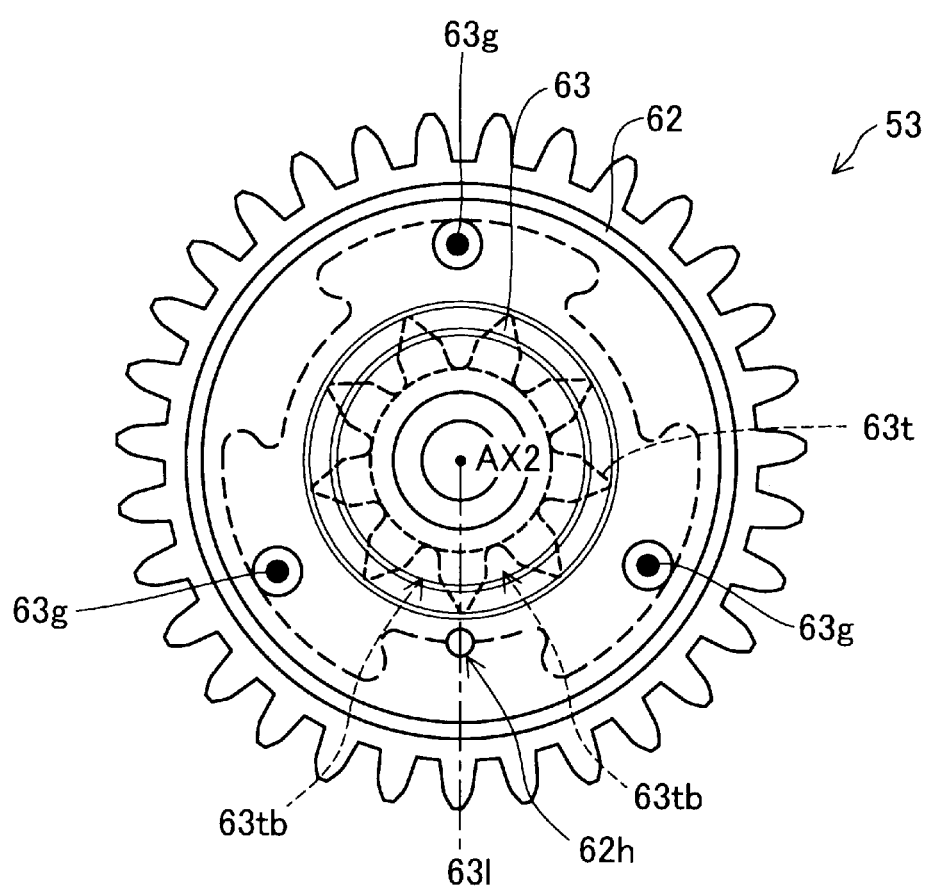
FIG. 18 is a descriptive diagram for describing a position of a positioning portion according to the first embodiment.

As shown in FIG. 18, the positioning portion 62h is placed along an imaginary line 63l, which radially connects between a circumferential center between circumferentially adjacent two of the bottom lands 63tb of the second small diameter external gear 63, which is the resin gear, and the axis AX2, which is a rotational center of the second intermediate gear 53. As discussed with reference to FIG. 14, the second small diameter external gear 63 is formed by filling the molten resin into the cavity 81 through the gates of the molding dies 80, 82. At this time, for example, in the case where the number of the gates is two or more, a location at or around a circumferential center between the two gates is a location where the molten resin injected through one of the two gates merges with the molten resin injected through the other one of the two gates. At this merging location, a weak portion called a weld line (also referred to as a weld mark) is formed due to insufficient adhesion of the merged resin. The strength of the portion, at which the weld line is formed, is lower than the other portion, at which the weld line is not formed. Therefore, the locations of the gates for the injection molding are determined such that the weld line is formed at a location where a force is less likely applied. In the present embodiment, the positioning portion 62h is placed along the imaginary line 63l, which radially connects between the circumferential center between the circumferentially adjacent two of the bottom lands 63tb of the second small diameter external gear 63, which is the resin gear, and the axis AX2, which is the rotational center. Therefore, the positions of the gates can be easily set such that the weld line is not formed at the bottom lands 63tb of the second small diameter external gear 63.

Figure 19:
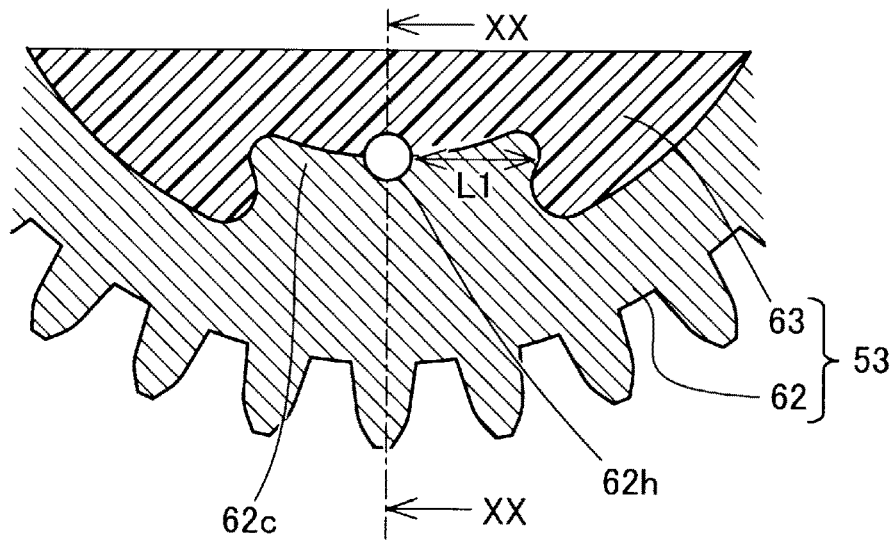
FIG. 19 is an enlarged view of the projection and its periphery in a case where the positioning portion is placed at a peripheral edge of the projection according to the first embodiment.
Figure 20:
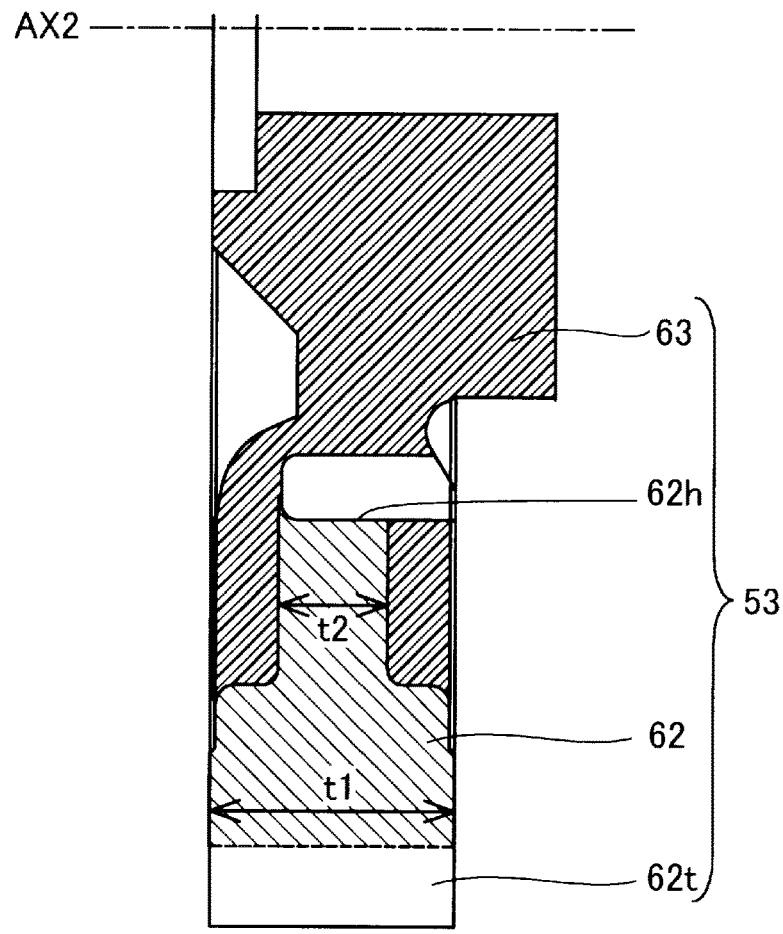
FIG. 20 is a cross-sectional view taken along line XX-XX in FIG. 19 showing the projection and its periphery in the case where the positioning portion is placed at the peripheral edge of the projection according to the first embodiment.

As shown in FIGS. 19 and 20, the positioning portion 62h may be formed at a peripheral edge of the distal end part of the projection 62c. In this case, the positioning portion 62h is shaped in a notched form, in which a portion of the hole is opened in the radial direction. The positioning portion 62h is simultaneously formed at the time of forming the second large diameter external gear 62 through punching with a press machine. A size of the positioning portion 62h is determined by a thickness t2 and a width L1 of the projection 62c. The size of the positioning portion 62h can be reduced when the thickness t2 is reduced, and the width L1 is increased. Furthermore, when the positioning portion 62h is shaped in the notched form, it is not required to punch a hole, which coincides with a shape of the pin. Thereby, the processability through the press working can be improved. Furthermore, when the positioning portion 62h is shaped in the notched form and is placed at the peripheral edge of the distal end part of the projection 62c.

Now, it is assumed that the thickness (measured in the axial direction of the axis AX2) of the second large diameter external gear 62 is indicated by t1, and the thickness (measured in the axial direction of the axis AX2) of the projection 62c, which is the portion that is joined to the resin of the second small diameter external gear 63, is indicated by t2. In this instance, the thickness (measured in the axial direction of the axis AX2) of the second large diameter external gear 62 is the same as the thickness (measured in the axial direction of the axis AX2) of the large gear teeth 62t of the second large diameter external gear 62. In such a case, the location where the thickness t2 of the projection 62c satisfies the relationship of t1>t2 is a location, at which the thickness of the plate is thin, and the positioning portion 62h can be easily opened. Therefore, the processability through the press working is improved. As shown in FIGS. 18 and 19, the shape of the positioning portion 62h is a circle shape in the present embodiment. Alternatively, the shape of the positioning portion 62h may be changed to another shape such as an ellipse shape, a rectangle shape or a polygon shape; or a cutout shape obtained by partially cutting a portion of the ellipse shape, the rectangle shape or the polygon shape.

Figure 21:
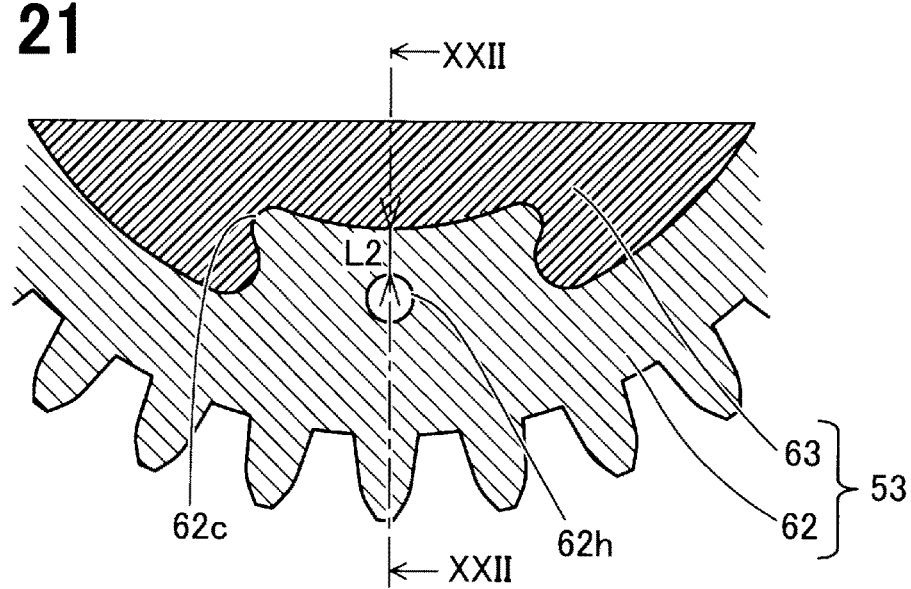
FIG. 21 is a cross-sectional view of the projection and its periphery in a case where the positioning portion is placed at an inside of the projection in a modification of the first embodiment.
Figure 22:
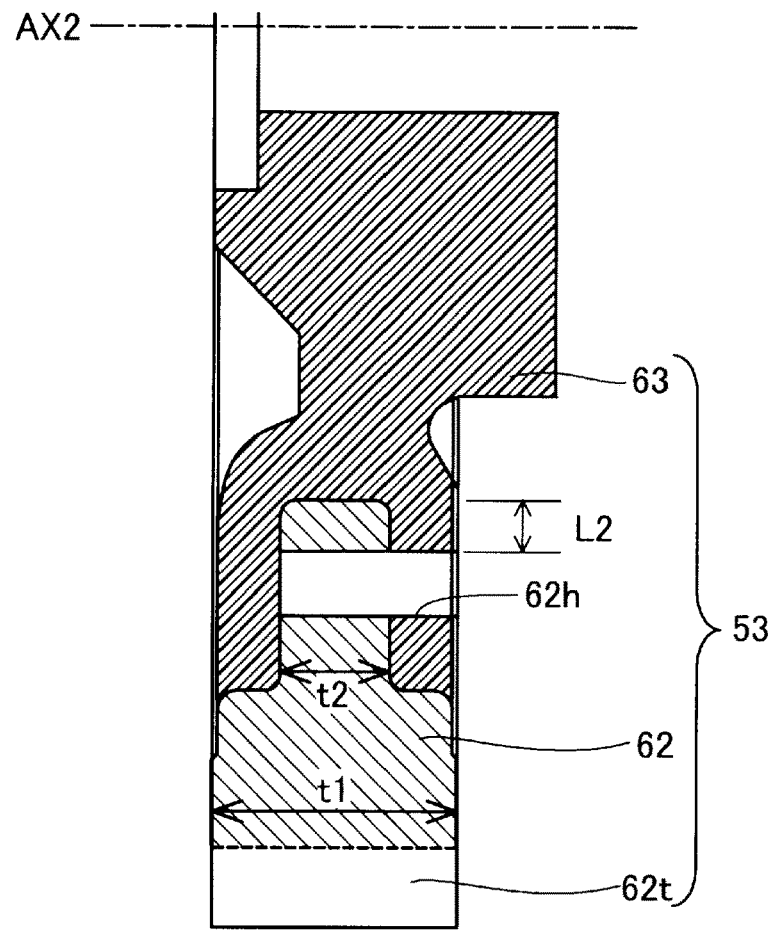
FIG. 22 is a cross-sectional view taken along line XXII-XXII in FIG. 21 showing the projection and its periphery in the case where the positioning portion is placed at the inside of the projection in the modification of the first embodiment.

Furthermore, as shown in FIGS. 21 and 22, which shows a modification of the first embodiment, the positioning portion 62h may be placed at a location in the inside of the projection 62c, which is inwardly displaced from the distal end part 62ct by a distance L2. In such a case, the shape of the positioning portion 62h may coincide with the shape of the pin. In the case where the positioning portion 62h is placed at the inside of the projection 62c, the location of the pin does not deviate in an opening direction (radial direction) of the notch, and thereby the second large diameter external gear 62 can be more accurately placed at the molding dies 80, 82.

Figure 23:
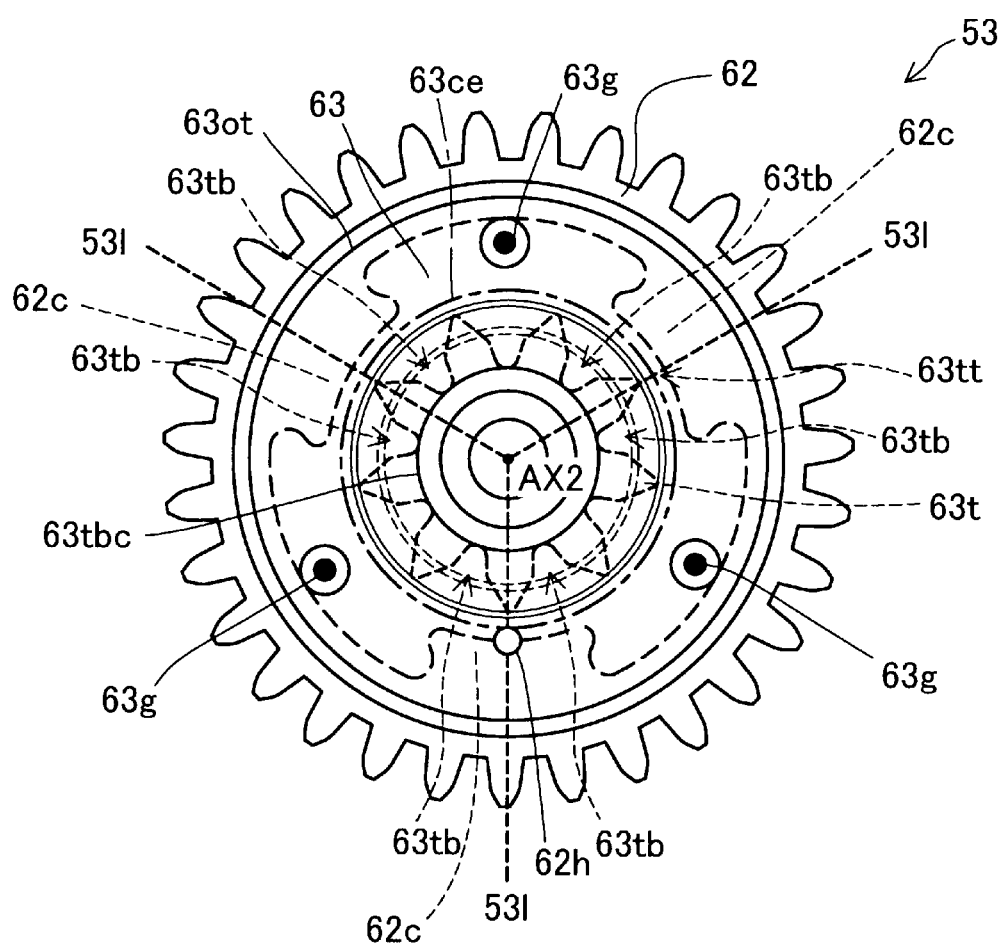
FIG. 23 is a descriptive diagram for describing positions of gate traces according to the first embodiment.

With reference to FIG. 23, the positional relationship between the gate traces 63g and the small gear teeth 63t will be described. In the second small diameter external gear 63, which is the resin gear, the number of the small gear teeth 63t is nine, and the number of the gate traces 63g is three. The three gate traces 63g are arranged along a concentric circle that is centered at the axis AX2. Each perpendicular bisector 53l of a line segment joining between adjacent two of the three gate traces 63g (i.e., a line that is perpendicular to a line segment joining between adjacent two of the three gate traces 63g and divides the line segment into two congruent segments) passes a location that is between adjacent two of the bottom lands 63tb at the small gear teeth 63t on the radially outer side of the axis AX2 where the adjacent two of the three gate traces 63g are located. In general, the weld line tends to be formed at the location, which is equally spaced from the adjacent two of the gate traces, i.e., at the location of the perpendicular bisector 53l. According to the present embodiment, the perpendicular bisector 53l extends through the location between the adjacent two bottom lands 63tb, i.e., the location of the tooth tip 63tt. That is, the weld line, which tends to be generated along the perpendicular bisector 53*l*, is not generated at the bottom lands 63*tb*, at which a large force is applied. Therefore, the durability of the second small diameter external gear 63 can be improved without deteriorating the strength of the second small diameter external gear 63. As a result, it is desirable to form the second small diameter external gear 63 by placing the gates of the molding dies 80, 82 at the locations where the gate traces 63*g* discussed above are formed.

In FIG. 23, the gate traces 63*g* are located on the radially outer side of an intermediate circumferential line 63*ce*, which is radially centered between a dedendum circle 63*tbc* of the small gear teeth 63*t* and an outermost periphery 63*ot* of the resin (resin member) of the second small diameter external gear 63. When the gates, which leave the gate traces at the above described locations, are used, the flow of the molten resin in the circumferential direction at the time of injecting the molten resin into to the cavity 81 can be made uniform.

Now, a modification of the first embodiment, in which the number of the gate traces is increased, will be described with reference FIG. 24. In the second small diameter external gear 63, which is the resin gear, of the modification shown in FIG. 24, the number of the small gear teeth 63*t* is nine, and the number of the gate traces 63*g* is nine. The nine gate traces 63*g* are arranged along a concentric circle that is centered at the axis AX2. Each perpendicular bisector 53*l* of the line segment joining between the corresponding adjacent two of the nine gate trances 63 passes a location that is between adjacent two of the bottom lands 63*tb* at the small gear teeth 63*t*, i.e., a location of the corresponding tooth tip 63*tt* circumferentially placed between the adjacent two of the bottom lands 63*tb* on the radially outer side of the axis AX2 where the adjacent two of the nine gate traces 63*g* are located. Therefore, like in the embodiment described with reference to FIG. 23, the weld line, which is likely to be generated along the perpendicular bisector 53*l*, is not generated at the bottom lands 63*tb*. Therefore, the strength of the second small diameter external gear 63 is not deteriorated. As a result, it is desirable to form the second small diameter external gear 63 by placing the gates of the molding dies 80, 82 at the locations where the gate traces 63*g* discussed above are formed.

Figure 24:
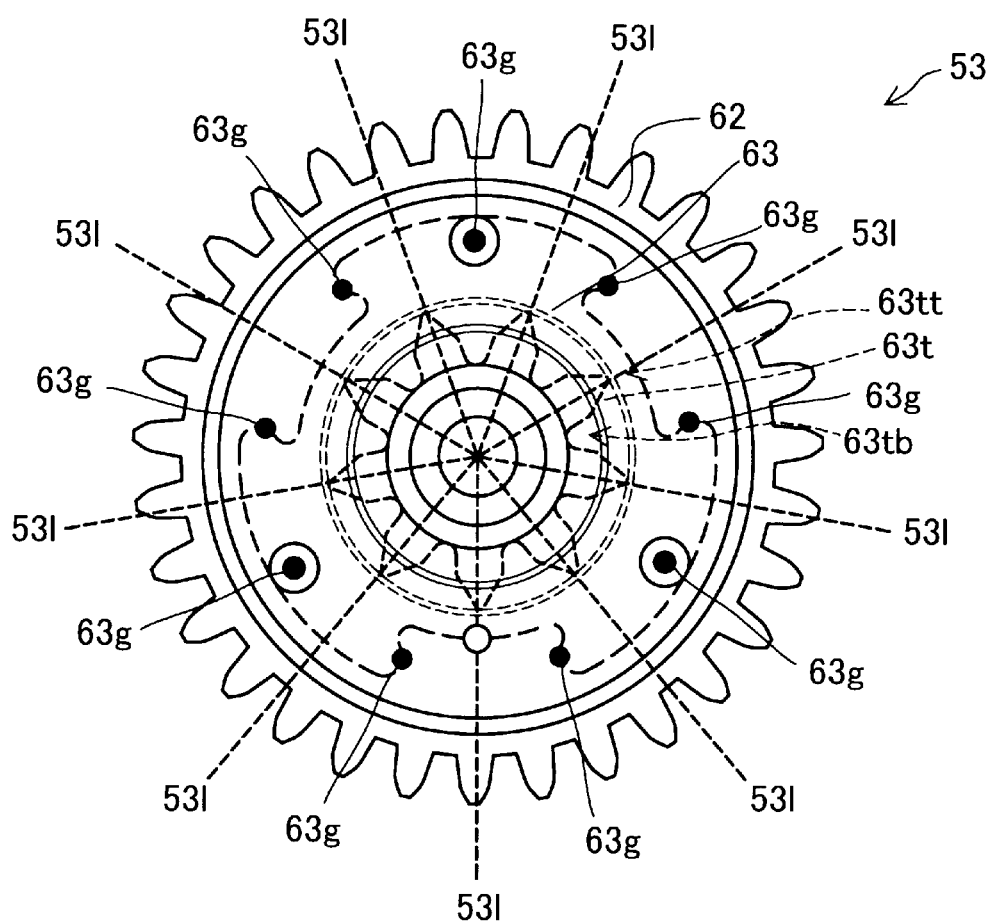
FIG. 24 is a descriptive diagram for describing positions of gate traces according to another modification of the first embodiment.

In each of the cases indicated in FIGS. 23 and 24, respectively, the number of the small gear teeth 63*t* is an integral multiple of the number of the gate traces 63*g*. Specifically, when the number of the small gear teeth 63*t* is set to be an integral multiple of the number of gate traces 63*g*, or conversely, when the number of the gate traces 63*g* is set to be an integral fraction of the number of the small gear teeth 63*t*, the locations of the gates of the molding dies 80, 82 may be set such that each perpendicular bisector 53*l* passes through the corresponding one of the tooth tips 63*tt*, i.e., the weld line is generated at the corresponding tooth tip 63*tt* and is not generated at the bottom lands 63*tb*. Therefore, even when a large force is applied to the second small diameter external gear 63, it is possible to limit the breakage of the second small diameter external gear 63. Thus, it is desirable that the number of the small gear teeth 63*t* is set to be an integral multiple of the number of the gate traces 63*g*, and the second small diameter external gear 63 is formed by placing the gates of the molding dies 80, 82 at the locations where the gate traces 63*g* discussed above are formed.

Figure 25:
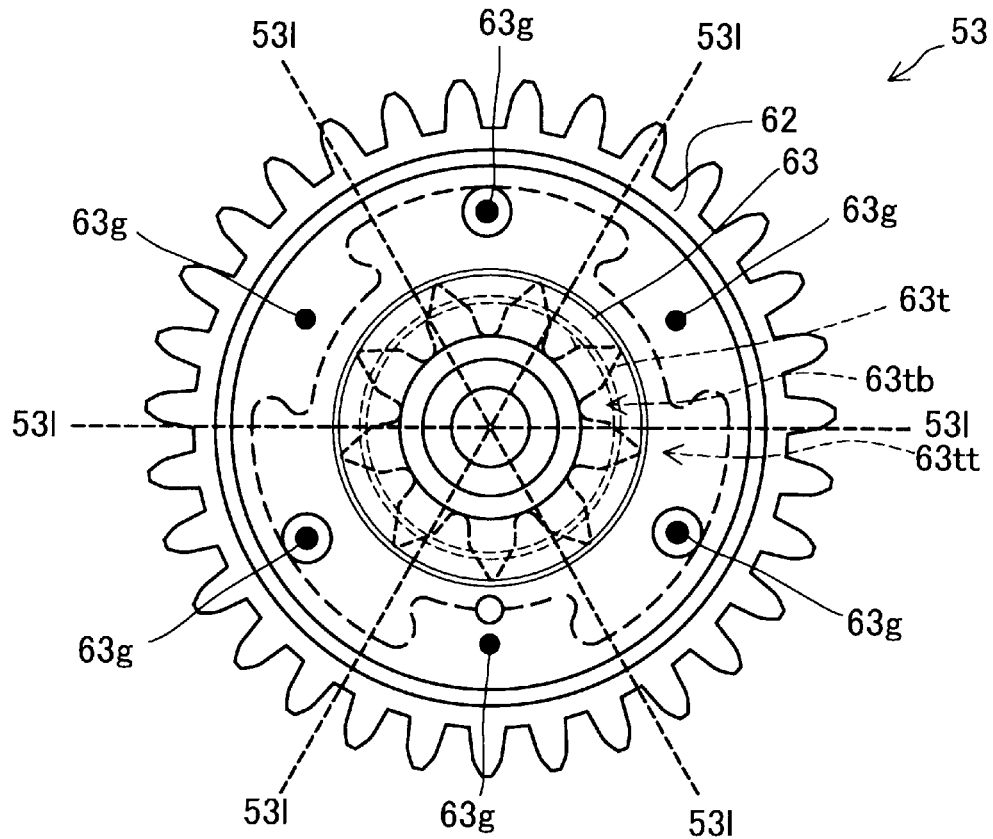
FIG. 25 is a descriptive diagram for describing positions of gate traces according to another modification of the first embodiment.

In another modification shown in FIG. 25, the number of the small gear teeth 63*t* is nine, and the number of the gate traces 63*g* is six. Therefore, the number of the small gear teeth 63*t* is not an integral multiple of the number of the gate traces 63*g*. Even in this case where the number of the small gear teeth 63*t* is not the integral multiple of the number of the gate traces 63*g*, it is possible to set each perpendicular bisector 53*l* such that the perpendicular bisector 53*l* does not pass through any of the bottom lands 63*tb*, as shown in FIG. 25. Therefore, although it is desirable that the number of the small gear teeth 63*t* is the integral multiple of the number of the gate traces 63*g*, the number of the small gear teeth 63*t* may not be the integral multiple of the number of the gate traces 63*g*. In such a case, for example, it is assumed that the number of the small gear teeth 63*t* is indicated by M, and the number of the gate traces 63*g* is indicated by N. When M/N is an odd number, the gate traces 63*g* may be placed at the bottom lands 63*tb* of the small gear teeth 63*t*. When M/N is an even number, the gate traces 63*g* may be placed at the tooth tips 63*tt* of the small gear teeth 63*t*. When M/N is not divisible, one of gate traces 63*g* may be placed at a corresponding one of the bottom lands 63*tb* of the small gear teeth 63*t*. In this way, the weld line may not be formed at any of the bottom lands 63*tb*.

Furthermore, as shown in FIG. 23, it is desirable that the gate traces 63*g* are placed at the locations where the gate traces 63*g* do not overlap with the projections 62*c*, i.e., where the projections 62*c* do not exist in a direction, which is parallel with the axial direction of the axis AX2 and passes any one of the gate traces 63*g*. That is, each of the projections 62*c* does not exist at any of the locations, at each of which the resin injected from the corresponding one of the gates, is directly applied. When each of the projections 62*c* does not exist at any one of the locations, at each of which the resin injected from the corresponding one of the gates is directly applied, the resin can easily flow to an opposite side of the projection 62*c*, which is opposite to the gate. Furthermore, since the injected resin is not directly applied to the second large diameter external gear 62, the second large diameter external gear 62 will not be moved or vibrated by the injection pressure of the resin. Thereby, the moldability of the second small diameter external gear 63 can be improved. Alternatively, each of the gate traces 63*g* may be placed at the location where the gate trace 63*g* overlaps with one of the projections 62*c* in the direction, which is parallel with the axial direction of the axis AX2 and passes the gate trace 63*g*. For instance, when the resin, which is injected from the three gates, is applied to the three projections 63 in a well-balanced manner, the second large diameter external gear 62 is unlikely to be moved or vibrated by the injection pressure of the resin.

The respective gate traces 63*g* may not remain as the trace, which has for example, the corresponding shape that corresponds to the gate, at the second small diameter external gear 63. For example, even if the gate traces 63*g* are erased by, for example, a file (i.e., a tool having a series of ridges or points on its surfaces for reducing or smoothing surfaces of the resin), the eased locations still serve as the gate traces 63*g*.

Second Embodiment

Figure 26:
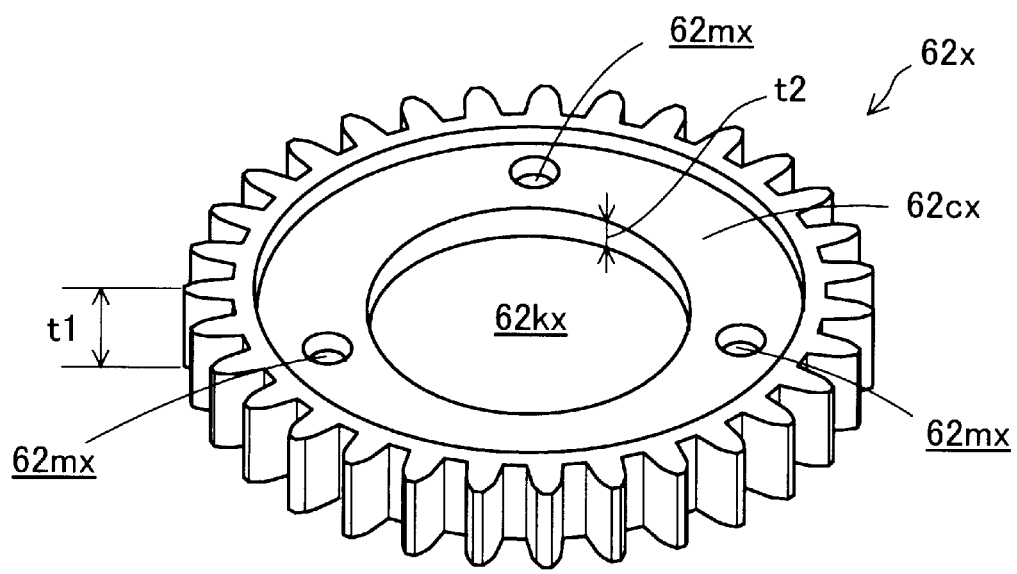
FIG. 26 is a descriptive diagram for describing a second large diameter external gear according to a second embodiment.

FIG. 26 shows a second large diameter external gear 62*x* of a second embodiment. In the second large diameter external gear 62*x* of the second embodiment, an inner flange 62*cx* is formed at an inner side of the second large diameter external gear 62*x*. The inner flange 62*cx* is a member that corresponds to the projections 62*c* of the first embodiment. It can be also said that the projection 62*c* is formed as an annular ring that extends along the entire inner circumference of the second large diameter external gear 62*x*. A large opening 62kx is formed on an inner side of the inner flange 62cx. Furthermore, a plurality of openings 62mx is formed at the inner flange 62cx. When the second small diameter external gear is formed, the resin of the second small diameter external gear is formed at an upper surface and a lower surface of the inner flange 62cx to hold the inner flange 62cx from two opposite axial sides of the inner flange 62cx. The resin at the upper surface of the inner flange 62cx and the resin at the lower surface of the inner flange 62cx are joined through the openings 62mx and the opening 62kx and are integrated into one piece. Specifically, even in the second embodiment, similar to the first embodiment, the second small diameter external gear, which is the resin gear, is molded integrally to the second large diameter external gear 62x, which is the metal gear.

Furthermore, even in the second embodiment, the resin, which forms the second small diameter external gear, holds the inner flange 62cx, which is the portion of the metal member, in the axial direction of the axis AX2 of the second intermediate gear from the two opposite axial sides of the inner flange 62cx. The above structure may be modified such that the resin is placed only at one of the upper surface and the lower surface of the inner flange 62cx.

Here, even in the second embodiment, it is assumed that a thickness (measured in the axial direction of the axis AX2) of the second large diameter external gear 62x is indicated by t1; a thickness (measured in the axial direction of the axis AX2) of the inner flange 62cx, which is the portion of the metal member, is indicated by t2; and a thickness (measured in the axial direction of the axis AX2) of a portion of the resin member, which holds the inner flange 62cx from the two opposite axial sides of the inner flange 62cx and is located at the location where the thickness t2 is measured, is indicated by t3. In such a case, there may be satisfied a relationship of t1>t2 and t1≥t3.

In the second embodiment, a convex corner and a concave corner of the inner flange 62cx, which become a boundary between the inner flange 62cx and the resin member, may be chamfered.

In the second embodiment, inner peripheral surfaces of the openings 62mx formed at the inner flange 62cx may respectively function as an action surface that applies a force, which is other than a frictional force, to the second small diameter external gear (the resin gear) in the rotational direction, or receives a force, which is other than the frictional force, from the second small diameter external gear in the rotational direction.

Even in the second embodiment, the inner flange 62cx may be shaped in a tapered form such that a thickness of a root of the inner flange 62cx measured in the axial direction of the axis AX2 is smaller than a thickness of a distal end part of the inner flange 62cx measured in the axial direction of the axis AX2.

Third Embodiment

Figure 27:
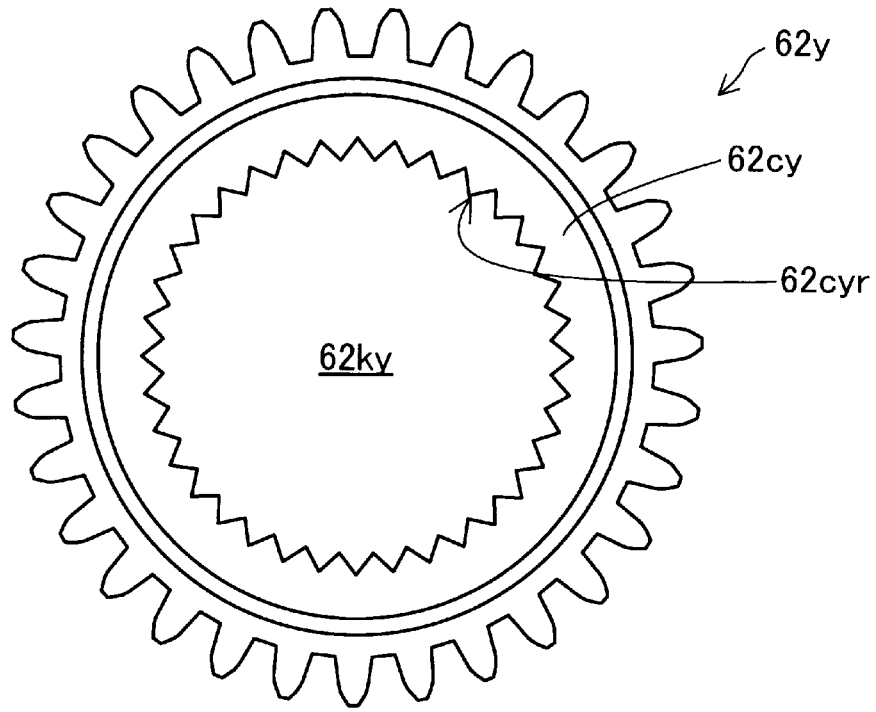
FIG. 27 is a descriptive diagram for describing a second large diameter external gear according to a third embodiment.

FIG. 27 shows a second large diameter external gear 62y of a third embodiment. The second large diameter external gear 62y of the third embodiment is similar to the second large diameter external gear 62x of the second embodiment with respect to that the second large diameter external gear 62y of the third embodiment has an inner flange 63cy. In the second large diameter external gear 62x of the second embodiment, the large opening 62kx is formed on the inner side of the inner flange 62cx, and the plurality of openings 62mx is formed at the inner flange 62cx. In contrast, the second large diameter external gear 62y of the third embodiment differs from the second large diameter external gear 62x of the second embodiment with respect to that a series of projections and recesses is formed at a circumferential surface 62cyr located at a boundary between the opening 62ky and the inner flange 62cy in the second large diameter external gear 62y of the third embodiment.

Even in the third embodiment, similar to the first and second embodiments, the second small diameter external gear, which is the resin gear, is molded integrally to the second large diameter external gear 62y, which is the metal gear, in one piece. Furthermore, the resin, which forms the second small diameter external gear, may hold the inner flange 62cy, which is the portion of the metal member, in the axial direction of the axis AX2 of the second intermediate gear from two opposite axial sides of the inner flange 62cy. Furthermore, with respect to the thicknesses t1, t2, t3 discussed in the second embodiment, there may be satisfied the relationship of t1>t2 and t1≥t3. A convex corner and a concave corner of the inner flange 62cy, which become a boundary between the inner flange 62cy and the resin member, may be chamfered. Furthermore, the series of projections and recesses formed at the circumferential surface 62cyr may function as the action surface discussed above. Each of the projections of the series of projections and recesses formed at the circumferential surface 62cyr may be shaped in a tapered form such that a thickness of a root of the projection measured in the axial direction of the axis AX2 is smaller than a thickness of a distal end part of the projection measured in the axial direction of the axis AX2.

The plurality of openings 62mx may be formed at the second large diameter external gear 62y of the third embodiment like the plurality of openings 62mx of the second large diameter external gear 62x of the second embodiment. With this configuration, the advantages, which are similar to those discussed in the second embodiment with respect to the openings 62mx, can be achieved.

Fourth Embodiment

Figure 28:
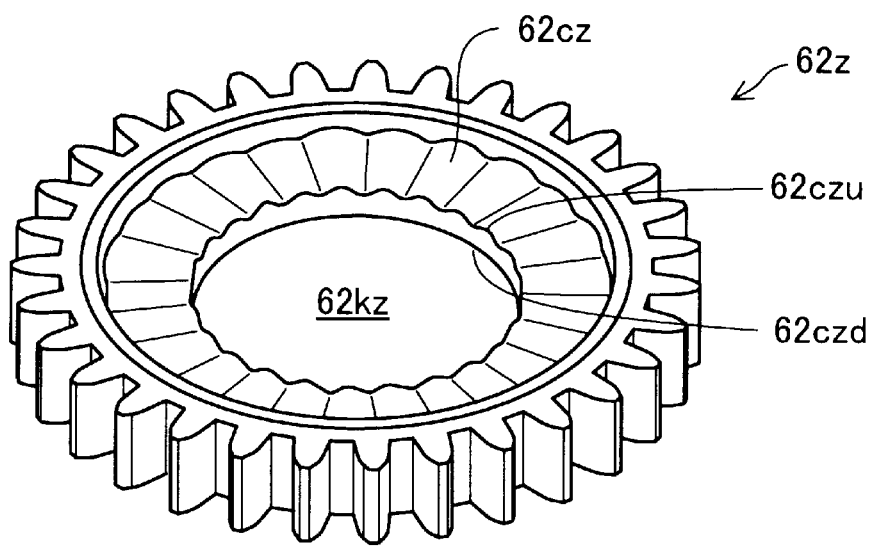
FIG. 28 is a descriptive diagram for describing a second large diameter external gear according to a fourth embodiment.
Figure 29:
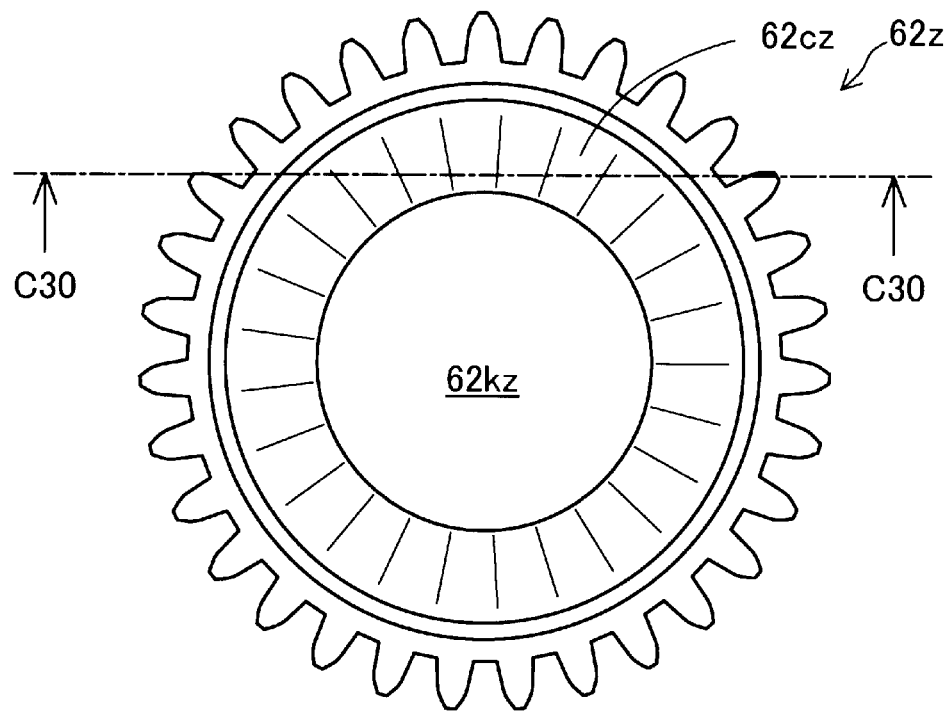
FIG. 29 is a plan view of the second large diameter external gear of the fourth embodiment.
Figure 30:
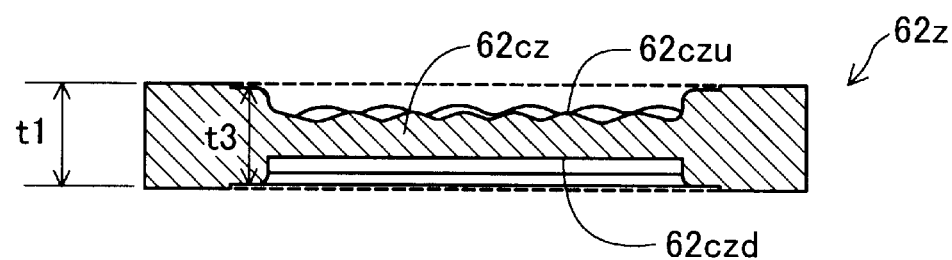
FIG. 30 is a cross-sectional view taken along line C30-C30 in FIG. 29 showing a cross-section of the second large diameter external gear of the fourth embodiment.

FIGS. 28, 29 and 30 show a second large diameter external gear 62z of a fourth embodiment. The second large diameter external gear 62z of the fourth embodiment is similar to that of the second and third embodiments with respect to the presence of the inner flange 62cz at the second large diameter external gear 62z while the inner flange 62cz defines the opening 62kz at the inside of the inner flange 62cz. In contrast to the presence of the plurality of openings 62mx at the inner flange 62cx of the second embodiment, an upper surface 62czu of the inner flange 62cz of the second large diameter external gear 62z of the fourth embodiment has a series of projections and recesses. Similar to the first to third embodiments, even in the fourth embodiment, the second small diameter external gear, which is the resin gear, is molded integrally to the second large diameter external gear 62z, which is the metal gear. In the fourth embodiment, the upper surface 62czu of the inner flange 62cz functions as the action surface discussed above. In the fourth embodiment, as shown in FIG. 30, a lower surface 62czd of the inner flange 62cz is a flat surface that does not have the series of projections and recesses. Alternatively, like the upper surface 62czu, the lower surface 62czd of the inner flange 62cz may be formed as a surface that has a series of projections and recesses. Furthermore, the lower surface 62czd of the inner flange 62cz may be formed as a surface that has a series of projections and recesses, and the upper surface 62*czu* of the inner flange 62*cz* may be formed as a flat surface.

Even in the fourth embodiment, the structure, which is discussed in the second and third embodiments, may be provided. Specifically, for example, the inner flange 62*cz* may have the plurality of openings 62*mx* and/or the series of projections and recesses formed at the circumferential surface 62*cyr*. With this configuration, the corresponding advantages discussed in the second and/or third embodiments can be achieved.

Fifth Embodiment

In the first to fourth embodiments, the second large diameter external gear 62 of the second intermediate gear 53 is the metal gear, and the second small diameter external gear 63 of the second intermediate gear 53 is the resin gear. A fifth embodiment differs from the first to fourth embodiments with respect to that the second large diameter external gear 162 of the second intermediate gear 153 is a resin gear, and the second small diameter external gear 163 is a metal gear. In the fifth embodiment, each of corresponding components, which correspond to the corresponding one of the components of the first embodiment, will be indicated by a reference sign that is obtained by adding 100 to the reference sign of the corresponding component of the first embodiment. Furthermore, the description of these components will be simplified or omitted in the fifth embodiment.

Figure 31:
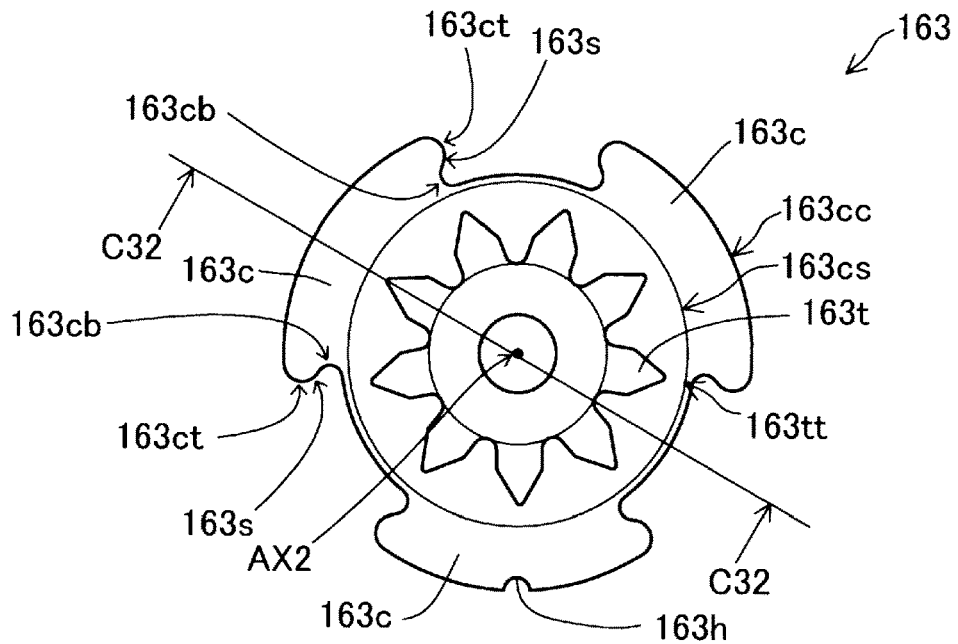
FIG. 31 is a plan view of a second small diameter external gear seen in an axial direction of an axis of the second small diameter external gear of a fifth embodiment.

FIG. 31 is a plan view of the second small diameter external gear 163 seen in the axial direction of the axial direction of the axis AX2. The second small diameter external gear 163 includes three projections 163*c*, which are circumferentially arranged and project outwardly in the radial direction. Similar to the projections 62*c* of the first embodiment, each of the three projections 163*c* has two action surfaces 163*s*, which are circumferentially opposite to each other. The action surface 163*s* is a surface that is not parallel to the rotational direction of the second small diameter external gear 163. The action surfaces 163*s* can limit relative movement between the second large diameter external gear 162 and the second small diameter external gear 163 to limit occurrence of wearing. Although it is preferred to have the action surfaces 163*s*, the action surfaces 163*s* may be eliminated depending on a need. For example, in a case where a boundary between the second large diameter external gear 162 and the second small diameter external gear 163 is a cylindrical surface that is parallel to the rotational direction of the second small diameter external gear 163, the action surface does not exist. However, a frictional force is generated between the second large diameter external gear 162 and the second small diameter external gear 163. Thus, relative movement between the second large diameter external gear 162 and the second small diameter external gear 163 can be limited by the frictional force.

Figure 32:
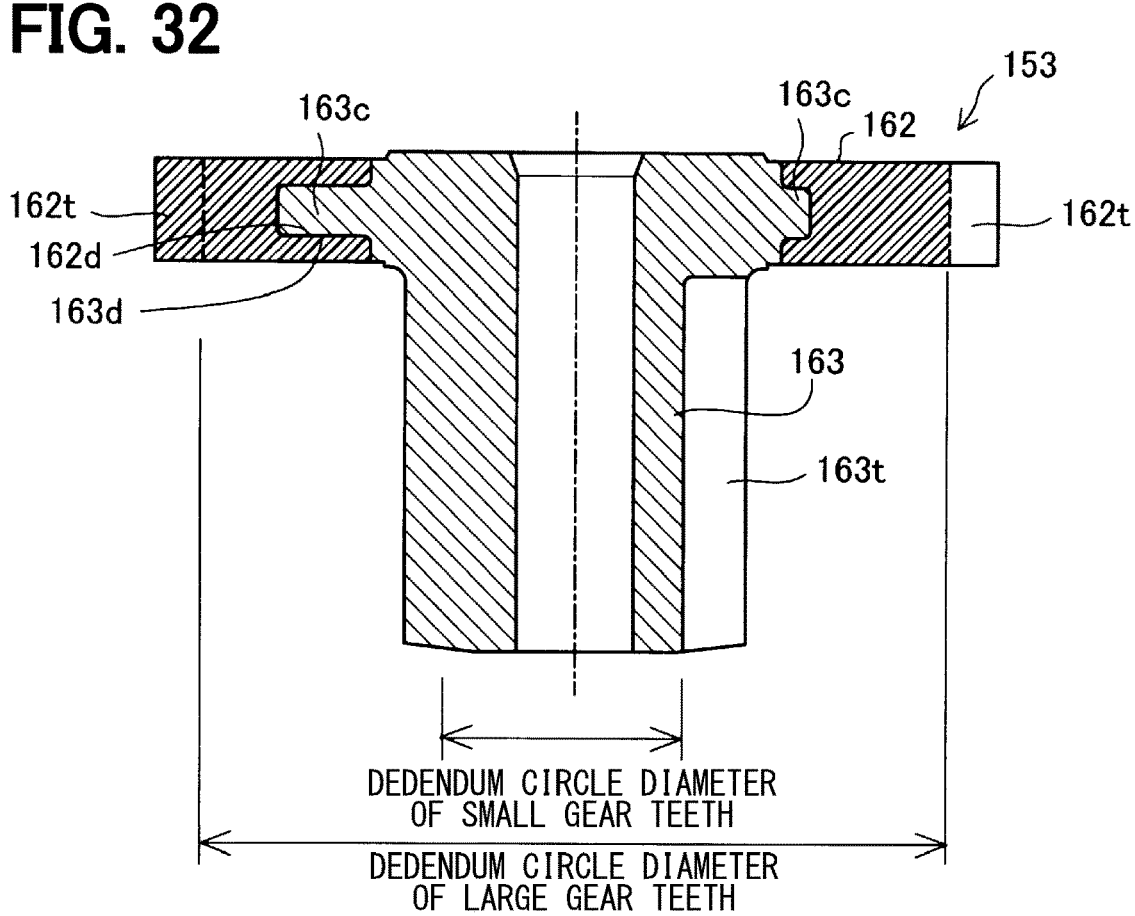
FIG. 32 is a cross-sectional view taken along line C32-C32 in FIG. 31 showing a cross section of the second intermediate gear of the fifth embodiment.

FIG. 32 is a descriptive diagram showing a cross section of the second intermediate gear 153 taken along line C32-C32 in FIG. 31 after resin molding of the second large diameter external gear 162 with the second intermediate gear 153. As shown in FIG. 32, the second small diameter external gear 163, which is the metal gear, includes the projections 163*c*, which are circumferentially arranged and project outwardly in the radial direction. The second large diameter external gear 162, which is the resin gear, is formed integrally in one piece with the second small diameter external gear 163, which is the metal gear, and the second large diameter external gear 162 holds each projection 163*c* in the axial direction of the axis AX2 from the two opposite axial sides of the projections 163*c*. Each of the projections 163*c* has a contact surface 163*d*, which is configured to contact the second large diameter external gear 162 in the axial direction of the axis AX2, at each of two opposite axial sides of the projection 163*c*. Also, the second large diameter external gear 162 has a plurality of contact surfaces 162*d*, each of which contacts the corresponding contact surface 163*d* of the corresponding projection 163*c*. Furthermore, at each of the two opposite axial sides of each projection 163*c*, the contact surface 163*d* and the contact surface 162*d* contact with each other without forming a gap between the contact surface 163*d* and the contact surface 162*d*. The second intermediate gear 153 includes the second large diameter external gear 162, which is the integrally molded resin gear. Therefore, the second large diameter external gear (the resin gear) 162 and the second small diameter external gear (the metal gear) 163 can be joined together without forming a gap therebetween regardless of the manufacturing accuracy of the second small diameter external gear (the metal gear) 163. Further, even when the temperature of the second intermediate gear 153 changes or when the gear torque or vibration applied to the second intermediate gear 153 changes, it is difficult for a gap to be formed between the second large diameter external gear 162 and the second small diameter external gear 163, and thereby durability of the second intermediate gear 153 can be improved.

As shown in FIG. 32, each of the projections 163*c* is held by the resin in the axial direction of the axis AX2 from the two opposite axial sides of the projection 163*c*. Therefore, it is possible to limit detachment between the second large diameter external gear 162 and the second small diameter external gear 163 in the thrust direction, i.e., the axial direction of the axis AX2. As a result, the reliability of the second intermediate gear 153 with respect to the load and vibration applied in the axial direction of the axis AX2 can be improved. Although it is preferable to employ the structure, in which each projection 163*c* is held by the resin in the axial direction of the axis AX2 from the two opposite axial sides of the projection 163*c*, this structure may not be employed. Specifically, there may be used a structure, in which the resin exists only at the surface of one of the two opposite axial sides of the projection 163*c*.

Figure 33:
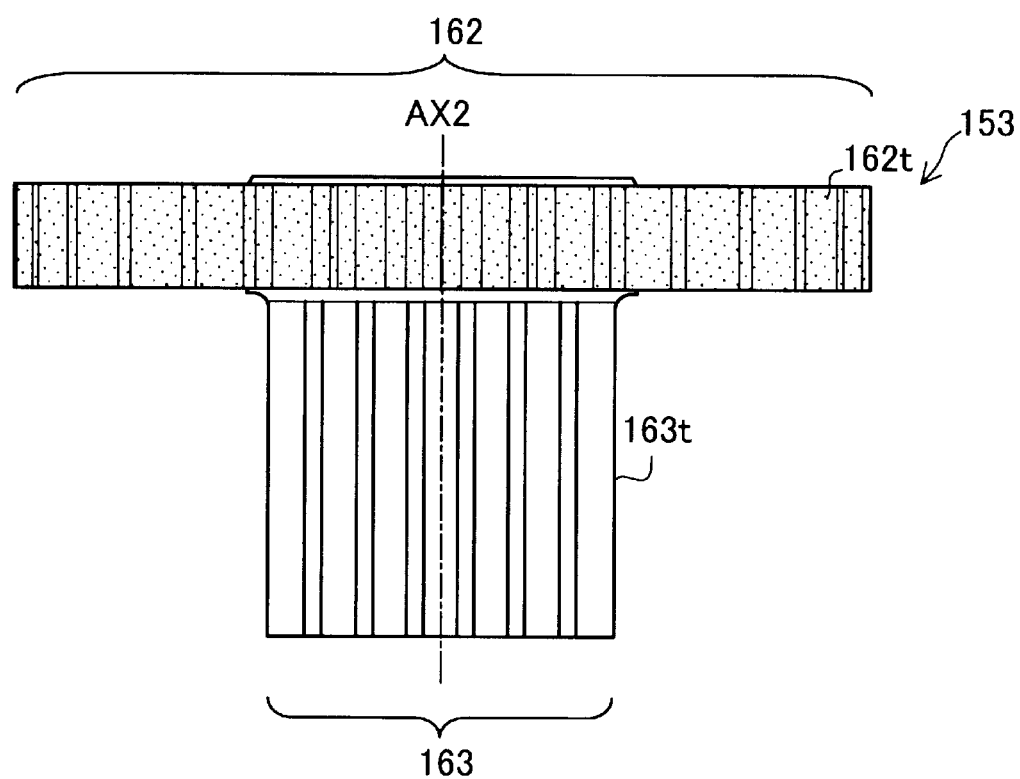
FIG. 33 is a side view of the second intermediate gear according to the fifth embodiment.
Figure 34:
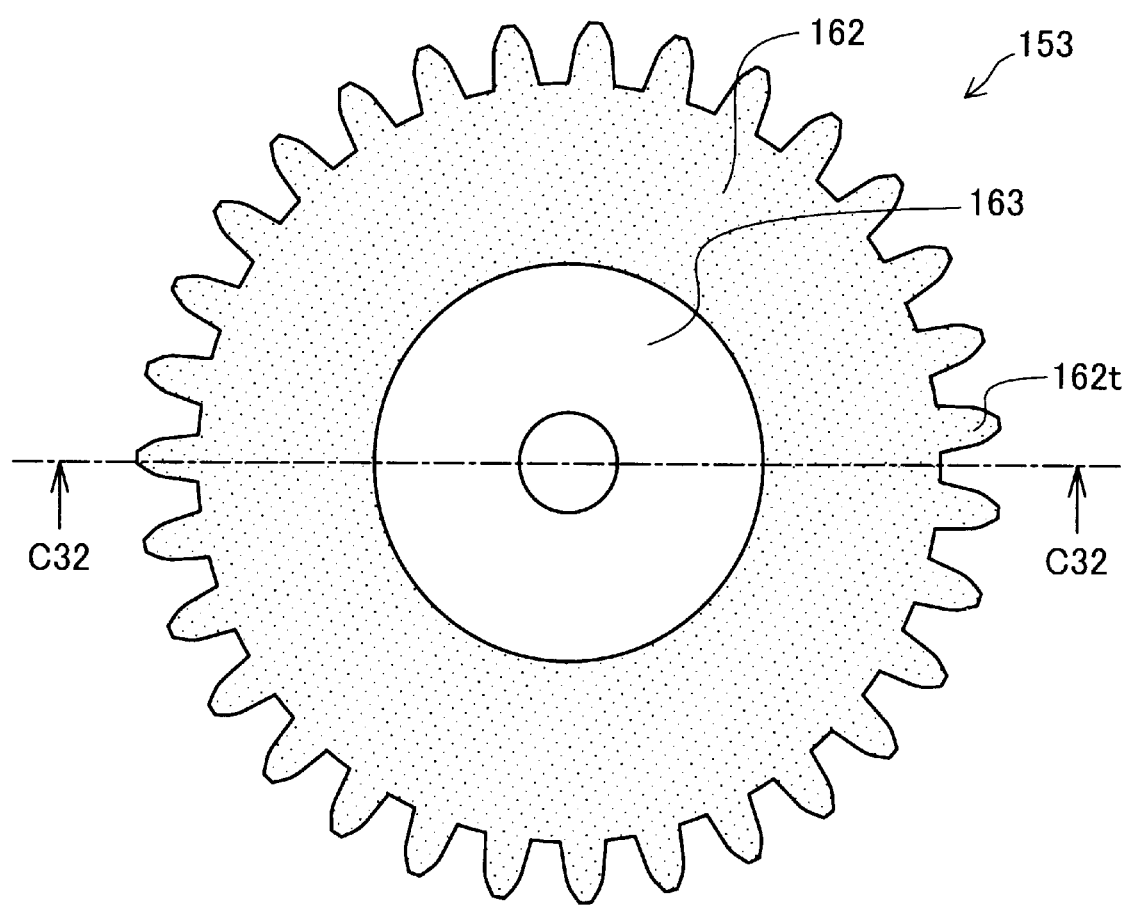
FIG. 34 is a plan view of the second intermediate gear of the fifth embodiment.

FIG. 33 is a front view of the second intermediate gear 153 seen in the direction perpendicular to the central axis AX2, which serves as the rotational center of the second intermediate gear 153. FIG. 34 is a plan view of the second intermediate gear 153 seen from the second housing segment 42 side in the axial direction of the axis AX2. The second intermediate gear 153 includes: the second large diameter external gear 162, which is the resin gear and is placed at the outer side of the second intermediate gear 153; and the second small diameter external gear 163, which is the metal gear and is placed at the inner side of the second intermediate gear 153. The second small diameter external gear 163 projects from the second large diameter external gear 162 toward the first housing segment 41 side. The second large diameter external gear 162 includes the large gear teeth 162*t* at the outer periphery of the second large diameter external gear 162.

A thickness of the respective projections 163*c* will now be described with reference to FIG. 35. With respect to the second intermediate gear 153, it is assumed that a thickness (measured in the axial direction of the axis AX2) of the second large diameter external gear 162 is indicated by t1; a thickness (measured in the axial direction of the axis AX2)

of the projection 163c is indicated by t2; and a thickness (measured in the axial direction of the axis AX2) of a portion of the resin member, which holds the projection 163c from the two opposite axial sides of the projection 163c and is located at the location where the thickness t2 is measured, is indicated by t3. In such a case, the second intermediate gear 153 satisfies a relationship of t1>t2 and t1≥t3. In FIG. 35, although the measurement location of t2 and the measurement location of t3 are different from each other for the sake of convenience, the measurement location of t2 and the measurement location of t3 are the same location in reality. Furthermore, in this structure, the resin member of the second large diameter external gear 162 holds the projection 163c from the two opposite axial sides of the projection 163c at the location between the two end surfaces 162s of the second large diameter external gear 162, which are opposite to each other in the axial direction of the axis AX2. With this structure, it is possible to limit an interference between the resin of the second large diameter external gear 162, which is the resin gear, and the first intermediate gear 52, which is the mating gear that is meshed with the second large diameter external gear 162. Although it is preferable to satisfy the relationship of t1>t2 and t1≥t3, it is not absolutely necessary to satisfy this relationship.

Figure 35:
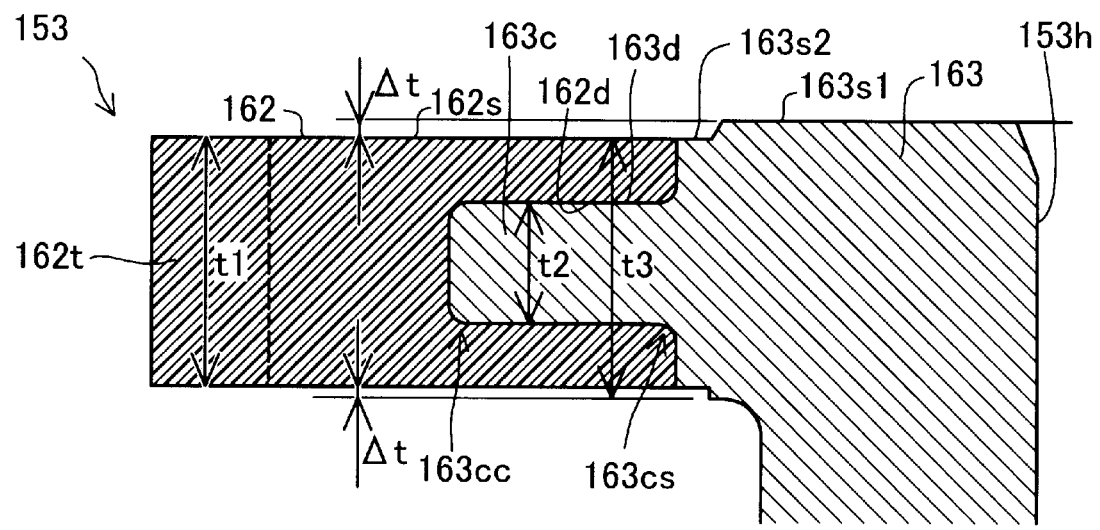
FIG. 35 is a cross-sectional view taken along line C32-C32 in FIG. 34 for describing a thickness of a projection of the fifth embodiment.

In the FIGS. 31 and 35, a convex corner 163cc and a concave corner 163cs of the projection 163c, which become a boundary between the projection 163c and the resin member, may be chamfered. The stress can be alleviated by the chamfering. Further, it is possible to limit occurrence of cracking and fatigue failure of the resin that is in contact with the convex corner 163cc or the concave corner 163cs. Alternatively, the convex corner 163cc and/or the concave corner 163cs may not be chamfered. As shown in FIG. 35, the second small diameter external gear 163 has end surfaces 163s1, 163s2 at each of two opposite axial sides thereof, which are opposite to each other in the axial direction of the axis AX2, and the second large diameter external gear 162 has the end surface 162s at each of two opposite axial sides of the portion of the second large diameter external gear 162 that holds the projection 163c from the two opposite axial sides of the projection 163c. At each of the two opposite axial sides of the second small diameter external gear 163, the end surfaces 163s1, 163s2 are stepped such that the end surface 163s2 is axially recessed from the end surface 163s1 toward the projection 163c side by the amount of Δt. Furthermore, at each of the two opposite axial sides of the second large diameter external gear 162, the end surface 162s is coplanar with the end surface 163s2. With this configuration, at the time of injection molding of the resin during the molding process of the second large diameter external gear 162, which is the resin gear, the resin can be cut such that the resin does not flow to the end surface 163s1 beyond the end surface 163s2.

Figure 36:
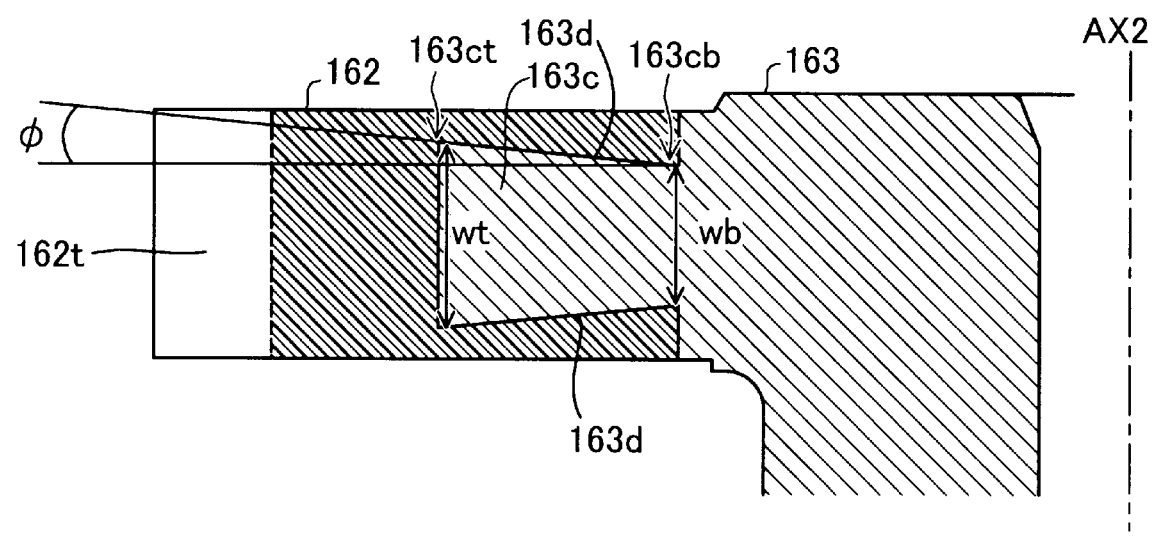
FIG. 36 is a descriptive diagram showing a projection having a tapered form in a modification of the fifth embodiment.

FIG. 36 indicates a modification of the projection 163c of the fifth embodiment. In the modification shown in FIG. 36, each of the projections 163c has a tapered form where a thickness wb of the root 163cb of the projection 163c, which is measured in the axial direction of the axis AX2, is smaller than a thickness wt of a distal end part 163ct of the projection 163c, which is measured in the axial direction of the axis AX2. When the resin is cured, the resin, which is shrunk, more closely contacts the projection 163c, and thereby generation of a gap between the second large diameter external gear 162 and the second small diameter external gear 163 at the action surface 163s can be limited. In order to reduce the thickness wb relative to the thickness wt, the contact surfaces 163d of the projection 163c may be tapered such that each of the contact surfaces 163d is tilted by an angle φ relative to a plane that is perpendicular the axis AX2, as shown in FIG. 36. The tapered form is not necessarily limited to the linear form shown in FIG. 36 and may be changed to a concave surface form or a convex surface form. Furthermore, instead of the tapered form, a stair form may be used. Furthermore, the tapered form may be provided at one or both of the two contact surfaces 163d. Alternatively, the projection 163c may be configured such that the thickness wb of the root 163cb of the projection 163c, which is measured in the axial direction of the axis AX2, is not smaller than the thickness wt of the distal end part 163ct of the projection 163c, which is measured in the axial direction of the axis AX2.

As shown in FIG. 31, the action surfaces 163s of the projection 163c may have a constricted shape, in which the root 163cb of the projection 163c is constricted relative to the distal end part 163ct of the projection 163c. In the case where the root 163cb is constricted at the projection 163c, as described with reference to FIG. 9, when the resin is cured, the resin, which is shrunk, more closely contacts the projection 163c, and thereby generation of a gap between the second large diameter external gear 162 and the second small diameter external gear 163 at the respective action surfaces 163s can be limited. Specifically, it is possible to limit the generation of the gap between the resin gear and the metal gear caused by the resin shrinkage at the time of molding the resin gear.

Figure 37:
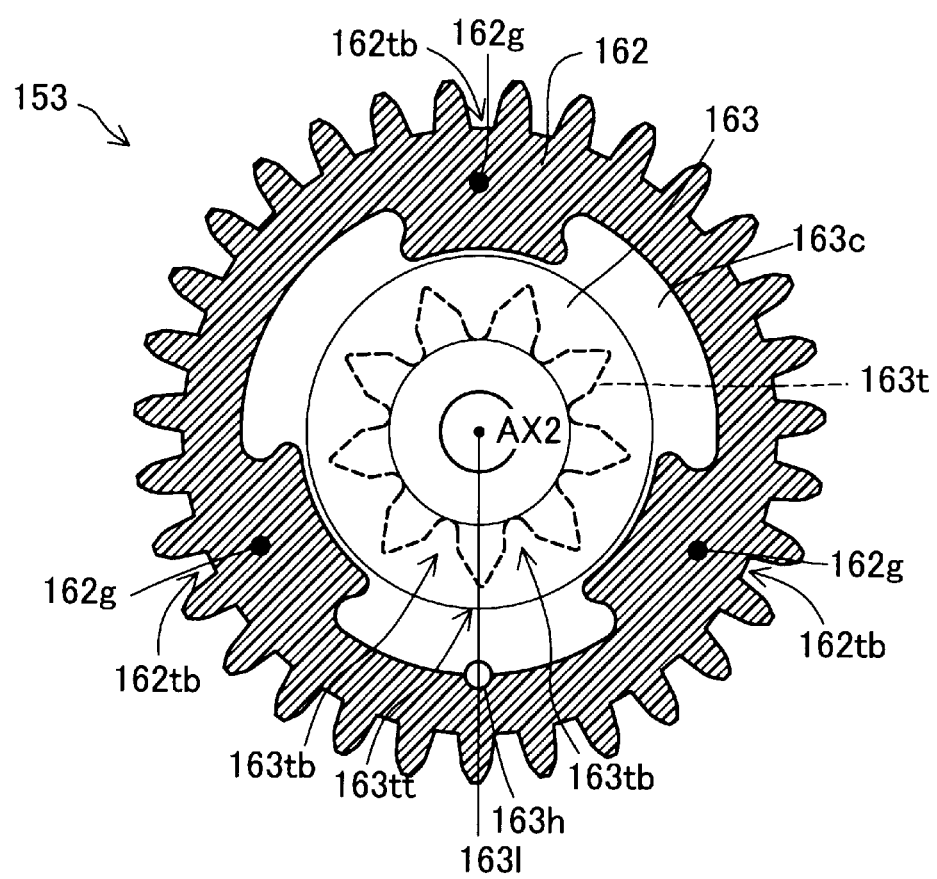
FIG. 37 is a descriptive diagram showing the positioning portion and gate traces according to the fifth embodiment.

As shown in FIG. 37, the positioning portion 163h is placed along an imaginary line 163l, which radially connects between a circumferential center (i.e., the tooth tip 163tt) between circumferentially adjacent two of the bottom lands 163tb of the second small diameter external gear 163, which is the metal gear, and the axis AX2, which is the rotational center. When the positioning portion 163h is placed at this position, the location of each of the gates can be easily set such that the weld line is not formed at the adjacent two of the bottom lands 162tb of the second large diameter external gear 162, which are adjacent to the gate. In FIG. 37, the locations of the gates are respectively indicated as the locations of the gate traces 162g. The gate traces 162g are arranged along, for example, a concentric circle that is centered at the axis AX2, such that the locations of the gate traces 162g respectively correspond to the locations of the corresponding bottom lands 162tb of the large gear teeth 162t. In this way, the generation of the weld line at the bottom lands 162tb is less likely to occur.

In the fifth embodiment, the projections 163c may be changed to a flange, which is similar to the flange of the second embodiment but is an outer flange rather than the inner flange of the second embodiment.

In each of the above embodiments, the principle of present disclosure is applied to the second intermediate gear 53 of the actuator 10. Alternatively, the principle of the present disclosure may be applied to the first intermediate gear 52. Furthermore, the actuator 10 of the present disclosure is described as the actuator 10 that opens and closes the wastegate valve 19, which controls the boost pressure of the supercharger. Alternatively, the actuator 10 of the present disclosure may be used for other purposes. For example, the actuator described in each of the above embodiments may be used as another type of actuator that is configured to control the boost pressure of the supercharger, such as an actuator, which drives a nozzle that changes a direction of the exhaust gas applied to a turbine of the supercharger 24, an actuator, which is for a twin-turbocharger or a two-stage turbocharger having two turbines and is configured to switch between the two turbines, or an actuator that is configured to switch a turbine of a variable-geometry turbocharger.

The present disclosure should not be limited to the above embodiments and may be implemented in various forms within a scope of the present disclosure. For example, the technical features of the respective embodiments, which correspond to the technical features of the aspects of the present disclosure recited in the summary section, may be appropriately replaced with another one or more technical features or may be combined with the technical features of the other embodiment(s) to achieve a portion or all of the objective(s) or to achieve a portion of all of the advantages discussed above. Further, if the technical feature(s) is not described as essential in the present specification, it may be eliminated as appropriate.

The present disclosure may be implemented in the following manner.

(1) According to one aspect of the present disclosure, there is provided an actuator. The actuator includes: an electric motor; an output shaft; and a speed reducer that is configured to transmit rotation, which is outputted from the electric motor, to the output shaft after reducing a speed of the rotation outputted from the electric motor, wherein: the speed reducer has a plurality of gears that include an output gear joined to the output shaft; the plurality of gears further includes a compound gear, wherein the compound gear includes a large diameter gear, which has a plurality of large gear teeth, and a small diameter gear, which has a plurality of small gear teeth; and one of the large diameter gear and the small diameter gear is a metal gear, which has a plurality of teeth and is made of a metal member, while another one of the large diameter gear and the small diameter gear is a resin gear, which has a plurality of teeth and is made of a resin member, and the resin gear is integrally molded together with the metal gear in one piece.

(2) In the above aspect, the resin member, which forms the resin gear, may hold a portion of the metal member, which forms the metal gear, in an axial direction of an axis of the compound gear from two opposite axial sides of the portion of the metal member. According to the this aspect, since the resin member holds the portion of the metal member (predetermined portion of the metal member) in the axial direction of an axis of the compound gear from the two opposite axial sides of the portion of the metal member, it is possible to limit removal of the resin gear and the metal gear in the thrust direction, i.e., the axial direction of the axis.

(3) In the above aspect, in the axial direction of the axis, a thickness of the plurality of large gear teeth of the large diameter gear may be indicated by t1. Also, in the axial direction of the axis, a thickness of the portion of the metal member joined to resin of the resin member may be indicated by t2. Furthermore, in the axial direction of the axis, a thickness of a fitting portion, at which the resin member and the metal member are fitted together, may be indicated by t3. In such a case, a relationship of t1>t2 and a relationship of t1≥t3 may be satisfied. The fitting portion may not extend in the axial direction of the axis beyond each of two end surfaces of the large diameter gear, which are perpendicular to the axis. According to this aspect, it is possible to limit the interference between the resin of the resin gear and the mating gear, which is meshed with the resin gear.

(4) In the above aspect, a convex corner and a concave corner of the metal, each of which becomes a boundary between the portion of the metal member and the resin member, may be chamfered. According to this aspect, the stress can be alleviated by the chamfering. Further, it is possible to limit occurrence of cracking and fatigue failure of the resin that is in contact with the convex corner or the concave corner.

(5) In the above aspect, in an axial direction of an axis of the compound gear, an end surface of the resin member may be recessed relative to an end surface of the metal gear toward the portion of the metal member. According to this aspect, at the time of injection molding of the resin during the molding process of the resin gear, the resin can be cut such that the resin does not flow to the end surface of the large diameter gear.

(6) In the above aspect, the portion of the metal member may have an action surface, which contacts the resin member, and the action surface may be configured to apply a force, which is other than a frictional force, to the resin gear in a rotational direction of the compound gear or receives a force, which is other than the frictional force, from the resin gear in the rotational direction. According to this aspect, it is possible to limit relative movement between the resin gear and the metal gear, and thereby it is possible to limit occurrence of wearing.

(7) In the above aspect, the portion of the metal member may include a projection that has the action surface; and the action surface may have a constricted shape where a root side of the action surface, at which a root of the projection is located, is constricted relative to a distal side of the action surface, at which a distal end part of the projection is located. According to this aspect, it is possible to limit the generation of the gap between the resin gear and the metal gear caused by the resin shrinkage at the time of molding the resin gear.

(8) In the above aspect, the portion of the metal member may have a tapered form where a thickness of a root of the portion of the metal member, which is measured in an axial direction of an axis of the compound gear, is smaller than a thickness of a distal end part of the portion of the metal member, which is measured in the axial direction of the axis. According to this aspect, when the resin is cured, the resin, which is shrunk, more closely contacts the portion of the metal member, and thereby generation of a gap between the resin gear and the metal gear can be limited.

(9) In the above aspect, the metal gear may include a positioning portion that is configured to position the metal gear in place at a time of integrally molding the resin gear with the metal gear. According to this aspect, at the time of positioning the metal gear during the molding process of the resin gear, the positioning portion is used instead of using the teeth of the metal gear, so that the teeth of the metal gear can be protected.

(10) In the above aspect, the positioning portion may be shaped in a notched form where a portion of a hole of the positioning portion is opened. The positioning portion may be formed at the metal gear by, for example, press working. According to this aspect, since the positioning portion is shaped in the notched form where the portion of the hole of the positioning portion is opened, the positioning portion is placed at a convenient location of the end part of the metal member, at which the hole can be easily formed. Therefore, the positioning portion can be easily formed.

(11) In the above aspect, the positioning portion may be placed along an imaginary line, which radially connects between: a circumferential center between circumferentially adjacent two of a plurality of bottom lands of the resin gear; and a rotational center of the compound gear. According to this aspect, the location of the gate can be easily set such that the weld line, which is generated through the injection of the resin, is not formed at the bottom lands of the resin gear.

(12) In the above aspect, in an axial direction of an axis of the compound gear, a thickness the large diameter gear may be indicated by t1. Also, in the axial direction of the axis, a thickness of the portion of the metal member joined to resin of the resin member may be indicated by t2. In such a case, the positioning portion may be formed at the portion of the metal member at a location where the thickness t2 of the portion of the metal member satisfies a relationship of t1>t2. According to this aspect, the positioning portion can be formed at the thin part of the portion of the metal member, so that the positioning portion can be easily formed.

(13) In the above aspect, the resin gear may include a plurality of gate traces, each of which is a trace of injection of resin; and a perpendicular bisector of a line segment joining between adjacent two of the plurality of gate traces passes a location that is between adjacent two of a plurality of bottom lands of the resin gear on a radially outer side of an axis of the compound gear where the adjacent two of the plurality of gate traces are located. According to this aspect, the weld line of the resin, which is injected in a manner that generates the above-described gate traces, extends along the location between the adjacent two of the bottom lands and does not extend along any one of the bottom lands, at which the largest force is applied. As a result, it is possible to limit the breakage of the resin gear.

(14) In the above aspect, a number of the plurality of teeth of the resin gear may be an integral multiple of a number of the plurality of gate traces; and the plurality of gate traces may be arranged at equal intervals along a concentric circle that is centered at a rotational center of the compound gear. According to this aspect, since the number of the plurality of teeth of the resin gear is the integral multiple of the number of the plurality of gate traces, the location of each of the gates can be easily set such that the perpendicular bisector passes the location between the adjacent two of the bottom lands of the resin gear, i.e., the weld line is not formed at the bottom lands.

(15) In the above aspect, each of the plurality of gate traces may be arranged such that a direction, which is parallel with the axis and passes through the gate trace, does not pass through the portion of the metal member. According to this aspect, the portion of the metal member does not exist at any one of the locations, at each of which the resin injected from the corresponding one of the gates is directly applied, so that the resin can easily flow to an opposite side of the portion of the metal member, which is opposite to the gate.

(16) In the above aspect, the large diameter gear may be the metal gear, and the small diameter gear may be the resin gear. According to this aspect, in the case where the output gear, which is meshed with the small diameter gear, is the resin gear, the meshing between the resin gears is implemented, so that the wearing of the resin gears can be limited.

(17) In the above aspect, the resin gear may have an axis hole, through which a shaft of the compound gear is inserted.

(18) In the above aspect, the small diameter gear, which is the resin gear, may have a tapered portion at a root of each of the plurality of small gear teeth of the small diameter gear, which is located on a side where the plurality of large gear teeth is placed. According to the above aspect, the required thickness of the resin at the resin gear is ensured, and an end part of each of the small gear teeth of the small diameter gear, which is located at the root of the small gear tooth of the small diameter gear, can be displaced toward the large gear side. Therefore, a radius of an arc of the R-shape (round shape) at the root of each of the small gear teeth of the small diameter gear can be increased, and the strength of the root of each of the small gear teeth of the small diameter gear can be increased.

(19) In the above aspect, each of the plurality of small gear teeth of the small diameter gear may have a round shaped portion at a root of each of the plurality of small gear teeth, which is located on a side where the large diameter gear is located in an axial direction of an axis of the compound gear; and one end surface of each of the plurality of large gear teeth is located on a side where the plurality of small gear teeth is placed in the axial direction of the axis while the round shaped portion is located on an opposite side of the one end surface of each of the plurality of large gear teeth, which is opposite to the plurality of small gear teeth in the axial direction of the axis and at which there is another end surface of each of the plurality of large gear teeth that is opposite to the plurality of small gear teeth in the axial direction of the axis. According to this aspect, it is possible to increase the meshing length (face width) of each of the small gear teeth of the small diameter gear.

(20) In the above aspect, the small diameter gear, which is the resin gear, includes a plurality of gate traces; and the plurality of gate traces is located on a radially outer side of an intermediate circumferential line, which is radially centered between a dedendum circle of the plurality of small gear teeth and an outermost periphery of the resin member of the small diameter gear. According to this aspect, the flow of the resin in the circumferential direction at the time of injecting the resin into to the cavity can be made uniform.

(21) In the above aspect, the actuator may be configured to drive a boost pressure control valve of a supercharger.

The present disclosure can be implemented in various other forms. For example, besides the actuator, which is configured to open and close the waste gate valve of the turbocharger, the present disclosure may be implemented as another type of actuator that is configured to control the boost pressure of the supercharger, such as an actuator, which is for a twin-turbocharger having two turbines and is configured to switch between the two turbines, or an actuator that is configured to switch a turbine of a variable-geometry turbocharger. Furthermore, the present disclosure may be implemented as an actuator that is used for another purpose, which is other than the controlling of the boost pressure at the supercharger. Furthermore, the present disclosure may be implemented as, for example, a manufacturing method of the compound gear, in which the metal gear and the resin gear are formed integrally in one piece.

What is claimed is:

1. An actuator comprising:
   an electric motor;
   an output shaft; and
   a speed reducer that is configured to transmit rotation, which is outputted from the electric motor, to the output shaft after reducing a speed of the rotation outputted from the electric motor, wherein:
   the speed reducer has a plurality of gears that include an output gear joined to the output shaft;

the plurality of gears further includes a compound gear, wherein the compound gear includes a large diameter gear, which has a plurality of large gear teeth, and a small diameter gear, which has a plurality of small gear teeth; and one of the large diameter gear and the small diameter gear is a metal gear, which is made of a metal member, while another one of the large diameter gear and the small diameter gear is a resin gear, which is made of a resin member, and the resin gear is integrally molded together with the metal gear in one piece;

each of the plurality of small gear teeth of the small diameter gear has a round shaped portion at a root of each of the plurality of small gear teeth, which is located on a side where the large diameter gear is located in an axial direction of an axis of the compound gear; and one end surface of each of the plurality of large gear teeth is located on a side where the plurality of small gear teeth is placed in the axial direction of the axis while the round shaped portion is recessed relative to the one end surface of each of the plurality of large gear teeth toward another end surface of each of the plurality of large gear teeth that is opposite to the plurality of small gear teeth in the axial direction of the axis.

2. The actuator according to claim 1, wherein the resin member, which forms the resin gear, holds a portion of the metal member, which forms the metal gear, in the axial direction of the axis direction of an axis of the compound gear from two opposite axial sides of the portion of the metal member.

3. The actuator according to claim 2, wherein:
in the axial direction of the axis, a thickness of the plurality of large gear teeth of the large diameter gear is indicated by t1;
in the axial direction of the axis, a thickness of the portion of the metal member joined to resin of the resin member is indicated by t2; and
in the axial direction of the axis, a thickness of a fitting portion, at which the resin member and the metal member are fitted together, is indicated by t3; and
a relationship of t1>t2 and a relationship of t1≥t3 are satisfied; and
the fitting portion does not extend in the axial direction of the axis beyond each of two end surfaces of the large diameter gear, which are perpendicular to the axis.

4. The actuator according to claim 2, wherein a convex corner or a concave corner of the portion of the metal member, which forms a boundary between the portion of the metal member and the resin member, is chamfered.

5. The actuator according to claim 1, wherein in the axial direction of the axis of the compound gear, an end surface of the resin member is recessed relative to an end surface of the metal gear toward a portion of the metal member.

6. The actuator according to claim 1, wherein a portion of the metal member has an action surface, which contacts the resin member, and the action surface is configured to apply a force, which is other than a frictional force, to the resin gear in a rotational direction of the compound gear or receives a force, which is other than the frictional force, from the resin gear in the rotational direction.

7. The actuator according to claim 1, wherein a portion of the metal member has a tapered form where a thickness of a root of the portion of the metal member, which is measured in the axial direction of the axis of the compound gear, is smaller than a thickness of a distal end part of the portion of the metal member, which is measured in the axial direction of the axis.

8. The actuator according to claim 1, wherein the metal gear includes a positioning portion that is configured to position the metal gear in place at a time of integrally molding the resin gear with the metal gear.

9. The actuator according to claim 8, wherein the positioning portion is shaped in a notched form where a portion of a hole of the positioning portion is opened.

10. The actuator according to claim 8, wherein the positioning portion is placed along an imaginary line, which radially connects between:
a circumferential center between circumferentially adjacent two of a plurality of bottom lands of the resin gear; and
a rotational center of the compound gear.

11. The actuator according to claim 8, wherein:
in the axial direction of the axis of the compound gear, a thickness of the large diameter gear is indicated by t1;
in the axial direction of the axis, a thickness of a portion of the metal member joined to resin of the resin member is indicated by t2; and
the positioning portion is formed at the portion of the metal member at a location where the thickness t2 of the portion of the metal member satisfies a relationship of t1>t2.

12. The actuator according to claim 1, wherein the resin gear has an axis hole, through which a shaft of the compound gear is inserted.

13. The actuator according to claim 1, wherein the small diameter gear, which is the resin gear, has a tapered portion at a root of each of the plurality of small gear teeth of the small diameter gear, which is located on a side where the plurality of large gear teeth is placed.

14. The actuator according to claim 1, wherein:
the small diameter gear, which is the resin gear, includes a plurality of gate traces; and
the plurality of gate traces is located on a radially outer side of an intermediate circumferential line, which is radially centered between a dedendum circle of the plurality of small gear teeth and an outermost periphery of the resin member of the small diameter gear.

15. The actuator according to claim 1, wherein the actuator is configured to drive a boost pressure control valve of a supercharger.

16. The actuator according to claim 1, wherein the small diameter gear is meshed with the output gear to transmit the rotation, which is outputted from the electric motor, to the output gear, and the output gear is made of resin.

17. An actuator comprising:
an electric motor;
an output shaft; and
a speed reducer that is configured to transmit rotation, which is outputted from the electric motor, to the output shaft after reducing a speed of the rotation outputted from the electric motor, wherein:
the speed reducer has a plurality of gears that include an output gear joined to the output shaft;
the plurality of gears further includes a compound gear, wherein the compound gear includes a large diameter gear, which has a plurality of large gear teeth, and a small diameter gear, which has a plurality of small gear teeth;
one of the large diameter gear and the small diameter gear is a metal gear, which is made of a metal member, while another one of the large diameter gear and the small diameter gear is a resin gear, which is made of a resin member, and the resin gear is integrally molded together with the metal gear in one piece;

the resin member, which forms the resin gear, holds a projection of the metal member, which projects in a radial direction of the compound gear;

the projection has first and second action surfaces which are opposite to each other in a circumferential direction of the compound gear and respectively contacts the resin member, and the first and second action surfaces are respectively configured to apply a force, which is other than a frictional force, to the resin gear in a rotational direction of the compound gear or receives a force, which is other than the frictional force, from the resin gear in the rotational direction;

the first and second action surfaces respectively have a constricted shape where a root side of the action surface, at which a root of the projection is located, is constricted relative to a distal side of the action surface, at which a distal end part of the projection is located; and first and second end surfaces of the projection, which are opposite to each other in an axial direction of the compound gear, respectively contact the resin member at a circumferential location between the first and second action surfaces of the projection.

18. The actuator according to claim 17, wherein the large diameter gear is the metal gear, and the small diameter gear is the resin gear.

19. The actuator according to claim 17, wherein the large diameter gear is the resin gear, and the small diameter gear is the metal gear.

20. The actuator according to claim 17, wherein the projection is entirely buried in and is entirely covered by the resin member.

21. The actuator according to claim 17, wherein the root side of each of the first and second action surfaces is a round surface that is circumferentially recessed toward a circumferential center of the projection which is located between the first and second action surfaces in the circumferential direction.

22. The actuator according to claim 17, wherein the projection has a positioning portion, which is configured to position the metal gear in place at a time of integrally molding the resin gear with the metal gear, and the positioning portion is formed as a radial recess that is radially recessed from a peripheral surface of the projection and extends in the axial direction.

23. An actuator comprising:
an electric motor;
an output shaft; and
a speed reducer that is configured to transmit rotation, which is outputted from the electric motor, to the output shaft after reducing a speed of the rotation outputted from the electric motor, wherein:
the speed reducer has a plurality of gears that include an output gear joined to the output shaft;
the plurality of gears further includes a compound gear, wherein the compound gear includes a large diameter gear, which has a plurality of large gear teeth, and a small diameter gear, which has a plurality of small gear teeth;
one of the large diameter gear and the small diameter gear is a metal gear, which is made of a metal member, while another one of the large diameter gear and the small diameter gear is a resin gear, which is made of a resin member, and the resin gear is integrally molded together with the metal gear in one piece;
the resin gear includes a plurality of gate traces, each of which is a trace of injection of resin; and
a perpendicular bisector of a line segment joining between adjacent two of the plurality of gate traces passes a location that is between adjacent two of a plurality of bottom lands of the resin gear on a radially outer side of an axis of the compound gear where the adjacent two of the plurality of gate traces are located.

24. The actuator according to claim 23, wherein:
a number of the plurality of teeth of the resin gear is an integral multiple of a number of the plurality of gate traces; and
the plurality of gate traces is arranged at equal intervals along a concentric circle that is centered at a rotational center of the compound gear.

25. The actuator according to claim 23, wherein each of the plurality of gate traces is arranged such that a direction, which is parallel with the axis of the compound gear and passes through the gate trace, does not pass through a portion of the metal member.

26. The actuator according to claim 23, wherein the large diameter gear is the metal gear, and the small diameter gear is the resin gear.

27. The actuator according to claim 23, wherein the large diameter gear is the resin gear, and the small diameter gear is the metal gear.

* * * * *